United States Patent
Inoue

(10) Patent No.: US 7,940,434 B2
(45) Date of Patent: May 10, 2011

(54) IMAGE PROCESSING APPARATUS, IMAGE FORMING APPARATUS, METHOD OF IMAGE PROCESSING, AND A COMPUTER-READABLE STORAGE MEDIUM STORING AN IMAGE PROCESSING PROGRAM

(75) Inventor: Chizu Inoue, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 586 days.

(21) Appl. No.: 11/650,247

(22) Filed: Jan. 4, 2007

(65) Prior Publication Data
US 2007/0153020 A1    Jul. 5, 2007

(30) Foreign Application Priority Data

Jan. 5, 2006  (JP) ................................ 2006-000380
Oct. 12, 2006 (JP) ................................ 2006-279012

(51) Int. Cl.
*G03F 3/08* (2006.01)
(52) U.S. Cl. ........ 358/518; 358/1.9; 358/1.15; 358/525; 382/162; 382/167; 345/591
(58) Field of Classification Search ................... 358/1.9, 358/1.15, 518, 525; 345/591; 382/162, 167
See application file for complete search history.

(56) References Cited

U.S. PATENT DOCUMENTS

| | | | | |
|---|---|---|---|---|
| 5,321,797 A | * | 6/1994 | Morton | 345/604 |
| 5,504,821 A | * | 4/1996 | Kanamori et al. | 382/167 |
| 5,926,559 A | * | 7/1999 | Ohta | 382/162 |
| 6,137,494 A | * | 10/2000 | Nin | 345/593 |
| 6,650,438 B1 | * | 11/2003 | Kress et al. | 358/1.9 |
| 6,825,958 B1 | * | 11/2004 | Fukasawa et al. | 358/523 |
| 7,483,174 B2 | * | 1/2009 | Tadas | 358/1.9 |
| 2001/0033260 A1 | * | 10/2001 | Nishitani et al. | 345/87 |
| 2001/0033288 A1 | * | 10/2001 | Nabeshima | 345/601 |
| 2005/0099660 A1 | * | 5/2005 | Yada et al. | 358/498 |
| 2006/0072135 A1 | * | 4/2006 | Umezawa et al. | 358/1.9 |

FOREIGN PATENT DOCUMENTS

| | | |
|---|---|---|
| JP | 10-200772 | 7/1998 |
| JP | 11-234531 | 8/1999 |
| JP | 2001-257899 | 9/2001 |
| JP | 2005-094565 | 4/2005 |
| JP | 2005-167503 | 6/2005 |
| JP | 2005-348421 | 12/2005 |

* cited by examiner

Primary Examiner — Twyler L Haskins
Assistant Examiner — Miya J Cato
(74) Attorney, Agent, or Firm — David G. Conlin; Steven M. Jensen; Edwards Angell Palmer & Dodge LLP

(57) ABSTRACT

In an image processing apparatus of the present invention, interpolation operations are performed with a LUT to obtain CMY image data corresponding to input RGB image data. The image processing apparatus includes a gamut selecting section for selecting a gamut corresponding to an inputted image, from an RGB color space, based on input RGB image data; a LUT writing section for changing CMY image data in the LUT to CMY image data corresponding to grid points contained in the selected gamut; and a position information changing section for writing position information in a memory, wherein the position information indicates RGB color space positions of the grid points contained in the selected gamut. Thus, the image processing apparatus of the present invention can save memory space.

18 Claims, 22 Drawing Sheets

FIG. 4 (g) T6: B≧G≧R

US 7,940,434 B2

IMAGE PROCESSING APPARATUS, IMAGE FORMING APPARATUS, METHOD OF IMAGE PROCESSING, AND A COMPUTER-READABLE STORAGE MEDIUM STORING AN IMAGE PROCESSING PROGRAM

This Nonprovisional application claims priority under ±U.S.C. §119(a) on Patent Application No. 000380/2006 filed in Japan on Jan. 5, 2006, and Patent Application No. 279012/2006 filed in Japan on Oct. 12, 2006, the entire contents of which are hereby incorporated by reference.

FIELD OF THE INVENTION

The present invention relates to an image processing apparatus in which image data of a first color system is converted into image data of a second color system. The invention also relates to an image forming apparatus, a control method of an image processing apparatus, an image processing program, and a computer-readable storage medium.

BACKGROUND OF THE INVENTION

For the conversion of inputted image data represented by one color space into output image data represented by another color space, there has been proposed a method of color conversion employing direct mapping or interpolation operations.

Direct mapping is a method of color conversion using a three-dimensional LUT (Look Up Table, operational memory), which is a table of correspondence between color space data of inputted image data and color space data of output image data.

However, since storing all corresponding output image data of inputted image data requires a considerable memory space, the three dimensional LUT is generally thinned out and three dimensional interpolation operations are performed to complement the table.

However, a problem of three dimensional interpolation operations is that, in the vicinity of color space borders, it requires data of grid points outside of the color space. As a result, accuracy of color conversion suffers.

As a countermeasure, there has been proposed a technique as described in Patent Publication 1. In Patent Publication 1, interpolations are performed only with the grid points that reside in a cubic or rectangular color space. For example, an eight-point interpolation is performed when all of the 8 grid points making up a grid corresponding to the input data reside in the color space. Otherwise, a four-point interpolation is performed that uses only data of grid points contained in the color space. That is, the technique changes the method by which interpolations are performed.

However, changing the method of interpolation is disadvantageous because each method uses different accessing patterns to the memory or requires different operation procedures. This requires more than one interpolation operation circuit for these different interpolation processes, with the result that cost is increased.

Further, Patent Publication 1 teaches storing distances between grid points, and shifting positions of the grid points by the equivalent distance in the vicinity of color space borders, so that interpolation operations are performed by regarding these border areas as an outermost edge of the color space, without using data of grid points that reside outside of the color space. However, since the shape of gamut (color space) is complex, a large data volume is required to store positions, and access to the data is rather complex.

Further, while the gamut that can be processed in the input and output devices of the image processing apparatus is usually spherical (ellipsoidal, football-like shape) in shape, the color space used in the calculations of three-dimensional interpolations is cubic or rectangular. Thus, if the spherical gamut were to be enveloped by the cubic or rectangular color space the color space would contain a large number of grid points that fall outside of the gamut. That is, the color space would contain a large number of grid points that are not used for the interpolation operations. In other words, when the data of the color space is to be used for the interpolation operations, an operational memory needs to store data of grid points that are not actually used for the interpolation operations. As a result, an unnecessarily large memory space is used and it has adverse effects on the processing capability of the image processing apparatus.

[Patent Publication 1]
Japanese Laid-Open Patent Publication No. 2001-257899 (published on Sep. 21, 2001)
[Patent Publication 2]
Japanese Laid-Open Patent Publication No. 2005-167503 (published on Jun. 23, 2005)

Patent Publication 2 discloses a technique for solving the foregoing problems. The technique disclosed in Patent Publication 2 is intended to improve processing capability of the image processing apparatus as follows. In this technique, a color space is set that corresponds in shape to the gamut that is reconstructable in the input and output devices of the image processing apparatus, and only the grid points contained in this color space are stored in the memory to reduce the number of grid points developed in the memory and thereby save memory space.

However, the technique as disclosed in Patent Publication 2 is merely optimization of a color space according to a gamut that is reconstructable in the input and output devices of the image processing apparatus. More specifically, the interpolation of the inputted image using the color space uses the grid points that reside in the gamut of the inputted image. However, since the gamut of the inputted image is confined in and smaller than the gamut that is reconstructable in the input and output devices of the image processing apparatus, the color space disclosed in Patent Publication 2 also requires the memory to store data of grid points that are not used for the interpolations, with the result that unnecessary memory space is used.

SUMMARY OF THE INVENTION

The present invention was made in view of the foregoing problems, and an object of the present invention is to save memory space and thereby improve processing capability in an image processing apparatus that generates image data of a second color system from image data of a first color system. Another object of the invention is to provide an optimum color conversion process, which is attained by changing the number of grid points according to the type of object and/or document, and then finding correspondence of color spaces between inputted image data and output image data, even when inputted image data and output image data have different color spaces.

In order to achieve the foregoing objects, an image processing apparatus according to the present invention includes: a memory in which image data of a second color system, corresponding to grid points set in a color space of a first color system is stored; a reading section for reading from the memory second color system image data of grid points corresponding to inputted image data of the first color system, by referring to position information concerning positions of the grid points in the color space of the first color system; an interpolating section for performing an interpolation operation with the second color system image data read by the reading section, so as to generate interpolated image data of the second color system, corresponding to the inputted image data of the first color system; an area selecting section for selecting, based on the inputted image data of the first color system and from the color space of the first color system, a distribution area of grid points necessary for the interpolation process; a data changing section for changing the image data of the second color system stored in the memory to second color system image data that correspond to the grid points contained in the distribution area; and a position information changing section for changing a content of the position information to information concerning positions of the grid points contained in the distribution area.

According to the foregoing arrangement, an interpolation process is performed based on data read out from the memory. The memory does not store data of all grid points contained in the color space of the first color system, but stores only data of grid points contained in an area formed in the color space according to an inputted image.

This allows data of unnecessary grid points to be excluded from the memory when interpolating each inputted image. As a result, memory space can be saved as compared with the conventional structure in which an interpolation process is performed by referring to a memory storing data of certain numbers of grid points. This enables the image processing apparatus to improve its processing capability (for example, processing speed).

In other words, by saving memory space, a spare memory space can be allocated to image processes other than the interpolation process. As a result, overall processing capability of the image processing apparatus can be improved.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 4(a) through FIG. 4(g) are diagrams showing unit cells in an RGB color space, in which FIG. 4(a) shows coordinates of each apex of a unit cell, and FIG. 4(b) through FIG. 4(g) show an example of selecting a tetrahedron according to differences in input values of tetrahedral interpolations.

DESCRIPTION OF THE EMBODIMENTS

First Embodiment

Figure 2:
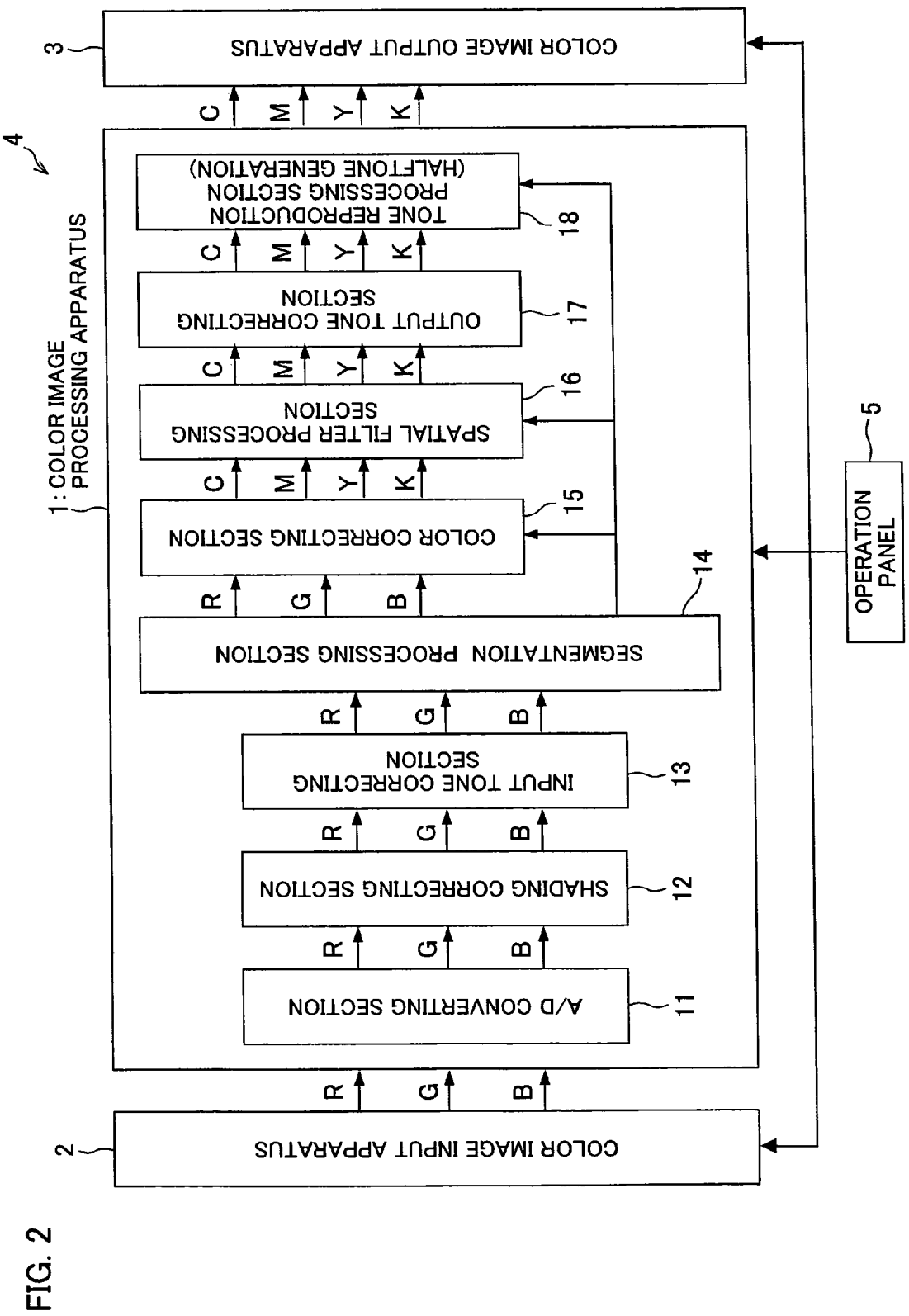
FIG. 2 is a block diagram showing an image forming apparatus provided with the image processing apparatus according to one embodiment of the present invention.

The following will describe one embodiment of the present invention with reference to the attached drawings. FIG. 2 is a block diagram showing a structure of an image forming apparatus (digital color copying machine) 4 including a color image processing apparatus according to one embodiment of the present invention.

As shown in FIG. 2, a color image processing apparatus 1 is connected to a color image input apparatus 2, a color image output apparatus 3, and an operation panel 5, which, as a whole, realize an image forming apparatus 4. In the following, the color image input apparatus 2, the color image processing apparatus 1, and the color image output apparatus 3 will be referred to as an image input apparatus 2, an image processing apparatus 1, and an image output apparatus 3, respectively.

The image processing apparatus 1 includes an A/D (analog/digital) converter 11, a shading correcting section 12, an input tone correcting section 13, a segmentation processing section (segmentation processing section) 14, a color correcting section 15, a spatial filter processing section 16, an output tone correcting section 17, and a tone reproduction processing section 18.

The operation panel 5 includes, for example, a display section such as a liquid crystal display, and setting buttons for controlling entire operations of the image forming apparatus 4 (for example, buttons for setting image modes (text mode, text/photographic mode, photographic mode, etc.) that indicate types of document to be copied).

The image input apparatus 2 is realized, for example, by a scanner section provided with a CCD (Charge Coupled Device). With the CCD, the image input apparatus 2 reads reflected images of a document as analog signals of R, G, B (R: red, G: green, B: blue), and supplies it to the image processing apparatus 1.

The analog signals read out by the image input apparatus 2 are outputted to the image output apparatus 3 as digital color signals of CMYK (C: cyan, M: magenta, Y: yellow, K: black), from the A/D converter 11, the shading correcting section 12, the input tone correcting section 13, the segmentation processing section 14, the color correcting section 15, the spatial filter processing section 16, the output tone correcting section 17, and to the tone reproduction processing section 18 in the image processing apparatus 1.

The A/D converter 11 converts the analog signals of RGB into digital signals. From the digital RGB signals sent from the A/D converter 11, the shading correcting section 12 removes various distortions, which occur in the illuminating, focusing, and/or sensing systems of the image input apparatus 2.

The input tone correcting section 13 balances colors for the RGB signals (reflectance signals of RGB) from which distortions have been removed by the shading correcting section 12, and processes the RGB signals into signals, such as density (pixel value) signals, that can be easily processed by an image processing system adopted by the color image processing apparatus 1.

Based on the RGB signals, the segmentation processing section 14 separates each pixel of the inputted image into any of a text area, a halftone area, and a photographic area (continuous tone area such as a photographic picture). Based on the result of separation, the segmentation processing section 14 outputs a segmentation class signal (segmentation class information), indicative of whether a pixel belongs to which area, to the color correcting section 15, the spatial filter processing section 16, and the tone reproduction processing section 18. The RGB signals sent from the input tone correcting section 13 are directly supplied to the color correcting section 15 of the immediately following stage.

For faithful color reproduction, the color correcting section 15 removes color impurity due to spectral characteristics of CMY (C: cyan, M: magenta, Y: yellow) inks that contain useless absorption components. The color correcting section 15 also performs a process of generating a black component and removing under color. Though detailed description will follow, an embodiment of the present invention realizes color correction that can be performed without changing the interpolation method for the conversion of RGB signals into CMY signals, or without requiring complex address calculations or large memory.

In the spatial filter processing section 16, the image data of CMYK signals supplied from the color correcting section 15 is subjected to a spatial filter process that is performed with a digital filter based on the segmentation class signal. The spatial filter process is intended to prevent blur, or deterioration of graininess in the output image. As with the spatial filter processing section 16, the tone reproduction processing section 18 also performs a predetermined process on the image data of CMYK signals based on the segmentation class signal.

For example, in order to improve reproducibility of color texts (chromatic texts), and particularly black texts (achromatic texts), the area identified as a text area by the segmentation processing section 14 is more enhanced in a high frequency range by the sharpness enhancement process in the spatial filter process performed by the spatial filter processing section 16. Here, the tone reproduction processing section 18 performs a binary process or a multi-level dithering process, using a high-resolution screen suited for the reproduction of a high-frequency range.

For an area identified as a halftone area by the segmentation processing section 14, the spatial filter processing section 16 performs a low-pass filter process for removing an input halftone component. The output tone correcting section 17 performs an output tone correction process in which the density (pixel value) signal and other signals are converted to a halftone area ratio, which is an attribute of the color image output apparatus 3. The tone reproduction processing section 18 then performs a tone reproduction process (halftone generation) whereby the image is finally divided into pixels to reproduce a tone of each pixel. An area identified as a photographic area (photographic picture) by the segmentation processing section 14 is subjected to a binary or multi-level dithering process using a screen that prioritizes tone reproduction.

The image data that has been subjected to the foregoing processes is temporarily stored in storage mean, and is read out at a predetermined timing for input into the image output apparatus 3.

The image output apparatus 3 outputs the image data onto a printing medium (for example, paper). The image output apparatus 3 can be realized, for example, by a color image output apparatus employing an electrophotographic or ink jet system. However, the type of image output apparatus 3 is not particularly limited. The foregoing processes are controlled by a CPU (Central Processing Unit) (not shown).

Figure 3:
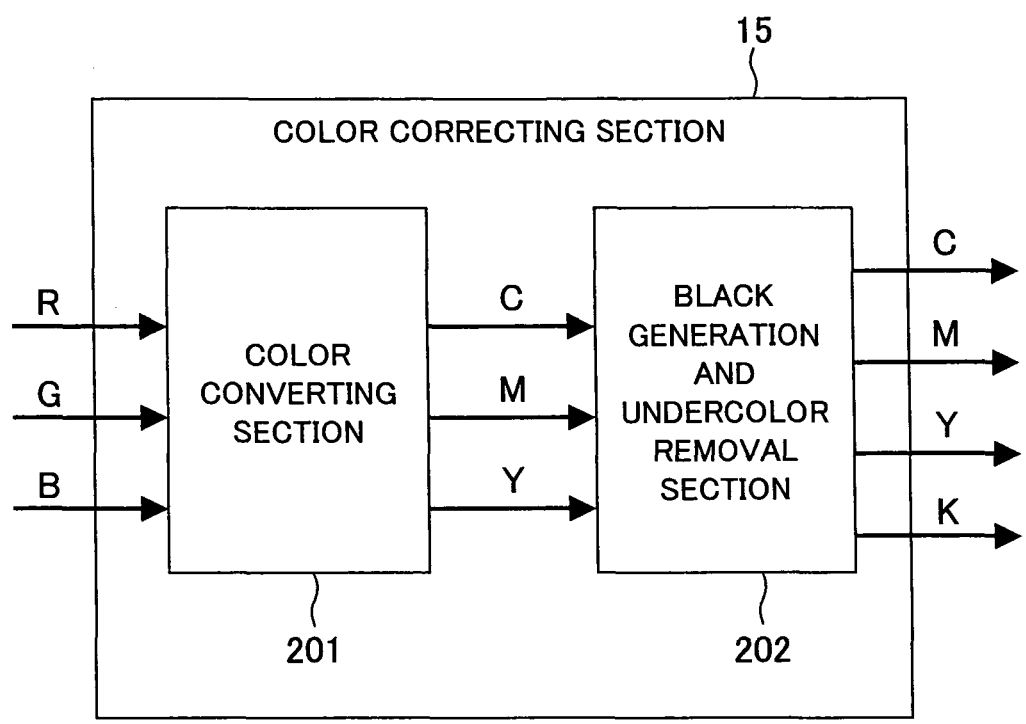
FIG. 3 is a block diagram showing a schematic structure of a color correcting section provided in the image processing apparatus shown in FIG. 2.

With reference to FIG. 3, the following describes the color correcting section 15 in detail. As shown in FIG. 3, the color correcting section 15 includes a color converting section (color converting section) 201, and a black generation and undercolor removal section 202.

The color converting section 201 is a block that converts the image data of RGB into image data of CMY by interpolation operation, and that outputs the image data of CMY to the black generation and undercolor removal section 202. The black generation and undercolor removal section 202 is a block that calculates a K signal based on the CMY signals supplied from the color converting section 201, and performs an undercolor removal process. The black generation and undercolor removal section 202 then sends CMYK signals (image data of a second color system) to the spatial filter processing section 16.

Exemplary methods of interpolation operation performed by the color converting section 201 are four-point interpolation (tetrahedral interpolation), eight-point interpolation, and six-point interpolation.

The following describes the tetrahedral interpolation. The tetrahedral interpolation uses a color space defined by three coordinate axes, as shown in FIG. 5. In the color space, a multiplicity of unit cells A, each forming a cube with 8 grid points are set along the respective coordinate axes, and the unit cell A is divided into a plurality of tetrahedrons (see FIG. 4). Then, according to the magnitude of the value of inputted image data, it is determined whether the value belongs to which of the unit cells A in the color space, and one of the tetrahedrons contained in the selected unit cell A is selected. Using the values of 4 apices (grid points) of the selected tetrahedron, a sum of products is calculated with the weighted values that have been obtained from the lower bits of the inputted image data. The resulting value is then used as output image data (interpolated value). The unit cell A can be divided into tetrahedrons by several different methods, which are decided in consideration of the non-linear characteristics of the input/output space of the device, or the axis to be memorized.

Figure 4:
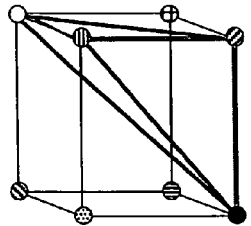
Figure 4:
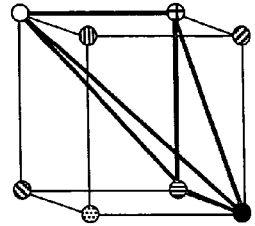
Figure 4:
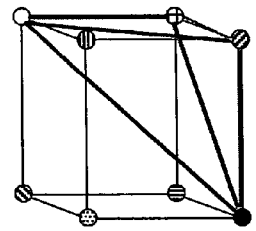
Figure 4:
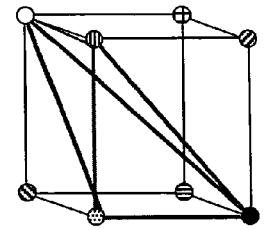
Figure 4:
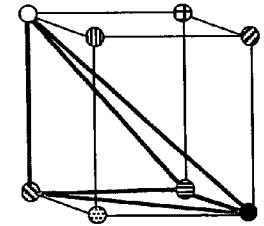
Figure 4:
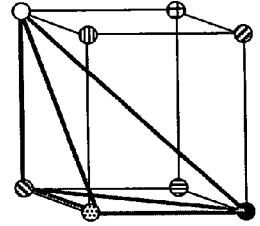
Figure 4:
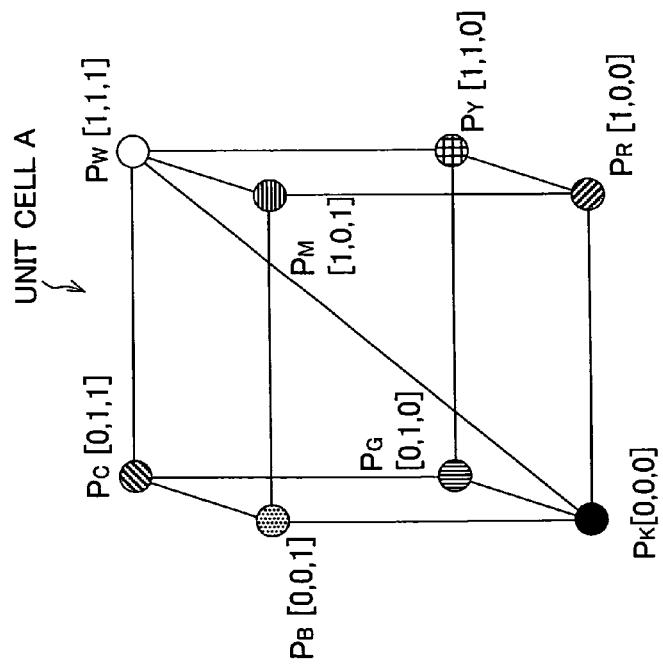
Figure 5:
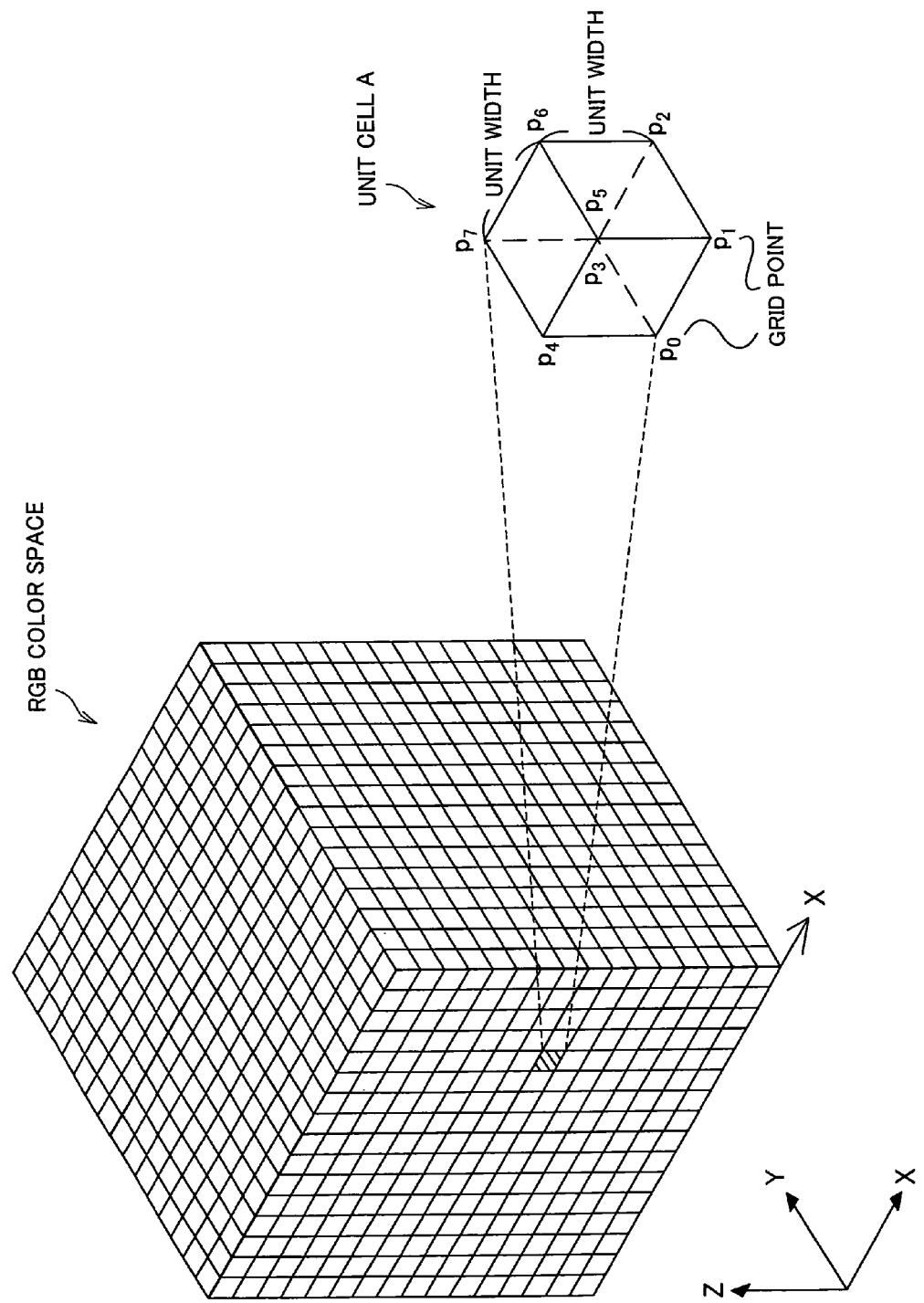
FIG. 5 is a conceptual view showing an RGB color space.

FIG. 4 illustrates an example of such division method. In the case of an RGB color space, the gray axis (axis connecting $P_K$ (0,0,0) and $P_W$ (1,1,1)) points at opposite angles. Memorizing the gray axis advantageously maintains continuity of the K component and prevents deterioration of image quality.

In addition to $P_K$ and $P_W$, the division method represented in FIG. 4 selects point $P_P$ for the first color system (primary colors: R, G, B), and point $P_S$ for the second color system (secondary colors: C, M, Y), from among $P_R$, $P_B$, $P_C$, $P_M$, $P_Y$, $P_G$. The selection is made according to the magnitude of each image data of RGB. As a result, one of the tetrahedrons as represented in FIG. 4(b) through FIG. 4(g) is selected according to the magnitude of each image data of RGB. For example, when the inputted image data is R>G>B, $P_R$ is selected as $P_P$, and $P_Y$ is selected as $P_S$, as shown in FIG. 4(b). As a result, tetrahedron T1 with apices $P_K$, $P_W$, $P_R$, and $P_Y$ is selected.

Figure 6:
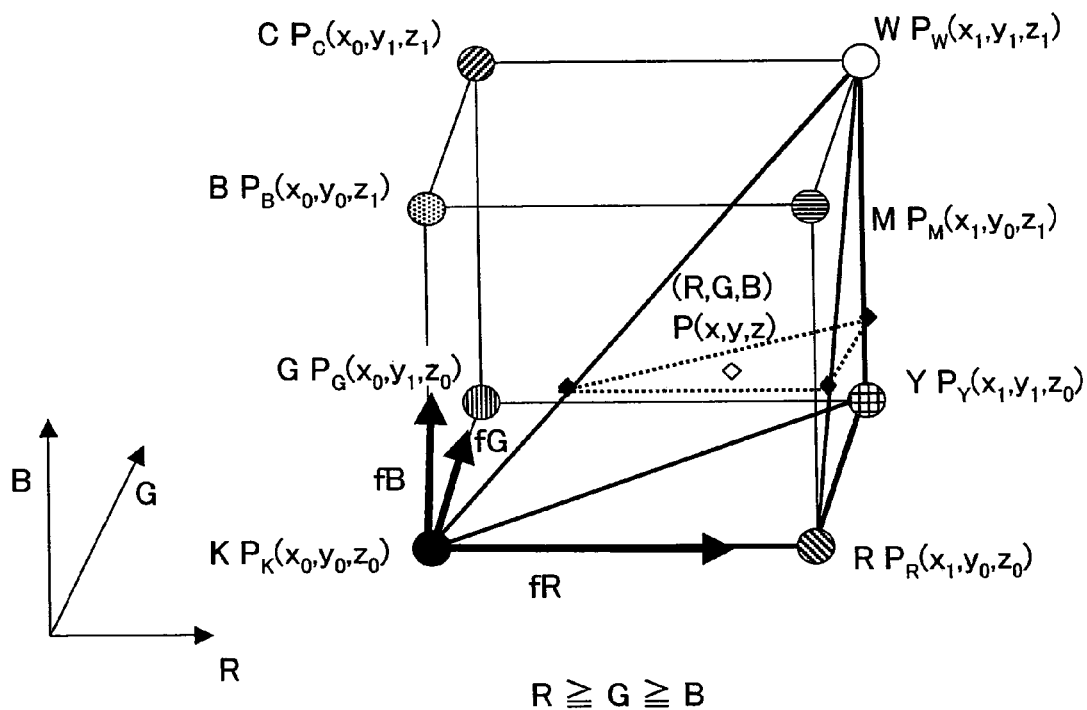
FIG. 6 is a diagram showing fractions for inputted image data in tetrahedral interpolations.

Next, calculations are made for the relative position of coordinates P(x,y,z) of the inputted image data with respect to the unit cell A. As shown in FIG. 6, when coordinates of the respective apices of the cube are $P_K(x_0, y_0, z_0)$, $P_R(x_1, y_0, z_0)$, $P_G(x_0, y_1, z_0)$, $P_B(x_0, y_0, z_1)$, $P_C(x_0, y_1, z_1)$, $P_M(x_1, y_0, z_1)$, $P_Y(x_1, y_1, z_0)$, and $P_W(x_1, y_1, z_1)$, the ratio (fraction) fR, fG, fB of each value of the coordinates P with respect to the cell width (width of unit cell A) is calculated from the lower bits of the inputted image data, according to the following Formula (1).

$$fR = \frac{x - x_0}{x_1 - x_0}$$
$$fG = \frac{y - y_0}{y_1 - y_0}$$
$$fB = \frac{z - z_0}{z_1 - z_0}$$
(1)

Table 1 below represents selected tetrahedrons and how they are weighted.

TABLE 1

| Tetrahedrons | Conditions | pP | pS | bK | bW | bP | bS |
|---|---|---|---|---|---|---|---|
| T1 | R ≥ G ≥ B | $P_R$ | $P_Y$ | 1 − fR | fB | fR − fG | fG − fB |
| T2 | R ≥ B ≥ G | $P_R$ | $P_M$ | 1 − fR | fG | fR − fB | fB − fG |
| T3 | B ≥ R ≥ G | $P_B$ | $P_M$ | 1 − fB | fG | fB − fR | fR − fG |
| T4 | G ≥ R ≥ B | $P_G$ | $P_Y$ | 1 − fG | fB | fG − fR | fR − fB |
| T5 | G ≥ B ≥ R | $P_G$ | $P_C$ | 1 − fG | fR | fG − fB | fB − fR |
| T6 | B ≥ G ≥ R | $P_B$ | $P_C$ | 1 − fB | fR | fB − fG | fG − fR |

Interpolation result P is finally obtained according to Formula (2) below.

$$P = bK \times P_K + bP \times P_P + bS \times P_S + bW \times P_W$$
(2)

where $P_P$, $P_S$, $P_K$, and $P_W$ represent image data for points $P_P$, $P_S$, $P_K$, and $P_W$, respectively. Denotations bK, bW, bP, bS represent weights for points $P_K$(K), $P_W$(W), $P_P$ (primary colors), $P_S$ (secondary color), respectively. Interpolation result P is obtained from the sum of products of these values. The tetrahedral interpolation generally follows the foregoing procedures.

In the present embodiment, description is given through the case where the interpolation operation is performed by tetrahedral interpolation by memorizing the gray axis, as described above. However, the method of interpolation is not just limited to this specific implementation. For example, eight-point interpolation may be performed. The tetrahedron is the smallest structure for defining a three-dimensional space, and it has four grid points that are accessed once. This is advantageous in reducing the cost of calculation. A drawback of tetrahedrons, however, is that a discontinuity may occur at the boundaries of the color spaces, because the color spaces are finely divided. Therefore, care must be taken in deciding which interpolation method to use, taking into account calculation cost, accuracy, device characteristics, for example.

The following will describe the color space used for the interpolation operation. Generally, the color space conventionally used for the three-dimensional interpolation is cubic or rectangular in shape. Thus, in performing the interpolation operation, various data at all grid points contained in the cubic or rectangular color space have been commonly developed beforehand in the memory used for the operation.

However, the interpolation operation generally does not require data of all grid points contained in the color space. Further, different grid points are required for the interpolation operation depending on the type of processed image. This is described below with reference to FIG. 7.

Figure 7:
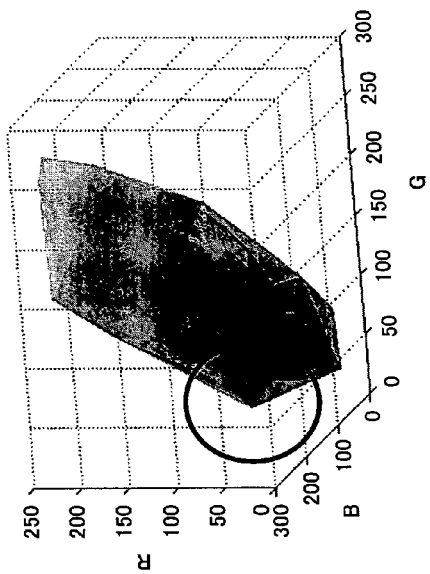
FIG. 7 is a diagram showing inputted images and distribution ranges of the inputted images in RGB color spaces.
Figure 7:
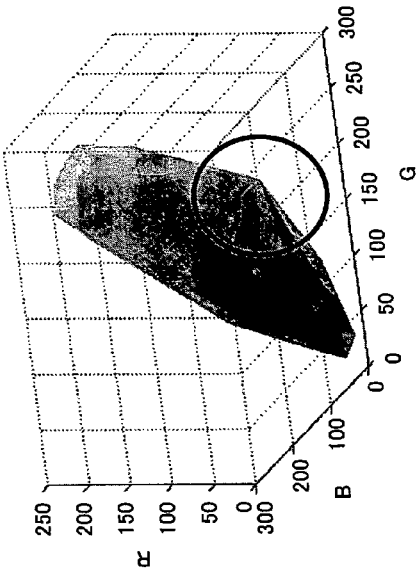
Figure 7:
Figure 7:
Figure 7:
Figure 7:

FIG. 7 represents images and distribution ranges (image gamut) of image data in RGB color spaces. Image A shown in FIG. 7 includes large blue areas such as sky and water, and its data distribution in the RGB color space is biased toward the B (blue) coordinate axis. Image B includes large green areas such as plants, and its data distribution in the RGB color space is biased toward the G (green) coordinate axis. Since different inputted images have different image data distributions, the grid points required for the interpolation operation differ greatly depending on the inputted image.

As a countermeasure, the color converting section 201 of the present embodiment is adapted to perform the following procedures. First, detection is made for the gamut of inputted image data (distribution range of inputted image data) in the RGB color space, and data of grid points required for the interpolation of points (image data) contained in the gamut are developed in a memory used for interpolation, so that the interpolation operation can be performed by referring to the data developed in the memory. This reduces the memory space allocated to the interpolation operation and enables the free memory space to be used for other processes of the image processing apparatus 1, as compared with the case where data of all grid points in the RGB color space are developed in the memory. As a result, the overall performance (for example, processing speed) of the image processing apparatus 1 can be improved.

Figure 1:
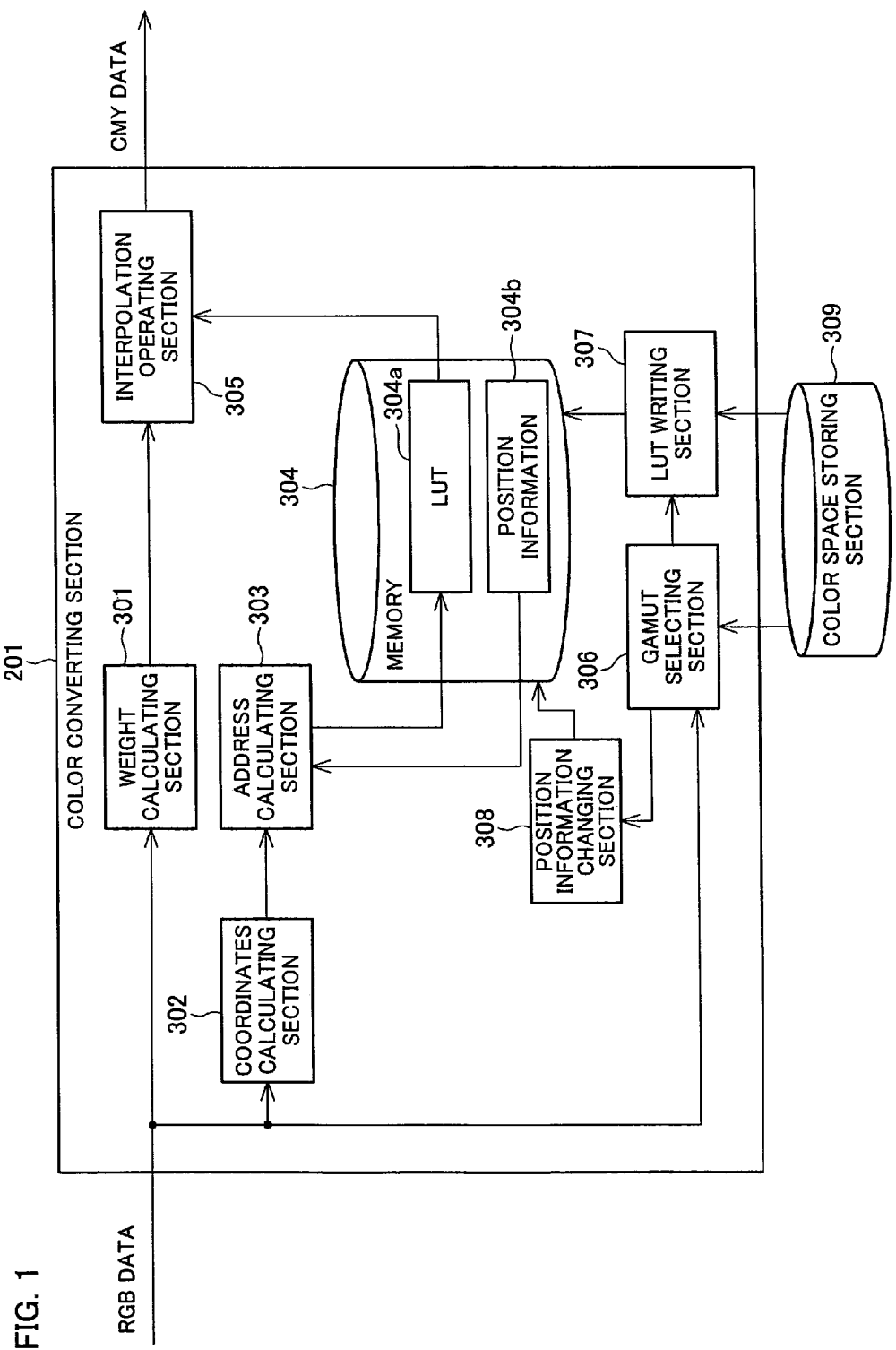
FIG. 1 is a block diagram showing a schematic structure of a color converting section of an image processing apparatus according to one embodiment of the present invention.

With reference to FIG. 1, the following will describe the color converting section 201 in more detail. As shown in FIG. 1, the color converting section 201 includes a weight calculating section 301, a coordinates calculating section 302, an address calculating section (reading section) 303, a memory 304, an interpolation operating section (interpolating section) 305, a gamut selecting section (area selecting section) 306, a LUT writing section (data changing section) 307, a position information changing section (position information changing section) 308, and a color space storing section 309. The memory 304 includes a rewritable LUT 304a where position information 304b (not shown) is written in.

The color space storing section 309 is a non-volatile storage device storing an RGB color space (for example as shown in FIG. 5), and CMY image data corresponding to the grid points set in the color space. In the present embodiment, the respective coordinate axes of the RGB color space (color space of the first color system) take the values of 0 to 255, and 16 grid units, i.e., 17 grid points, are set along each coordinate axis (see FIG. 5). In other words, the color space includes a total of 17×17×17=4913 grid points.

Based on the inputted image data of RGB (image data of the first color system), the gamut selecting section (area selecting section) 306 selects from the RGB color space a gamut for the inputted image. Based on the gamut so selected, the gamut selecting section 306 selects a distribution area of the grid points that correspond to the inputted image. As used herein, the "distribution area" refers to an area with the distributed grid points that are required for interpolating data in the gamut of the inputted image. The distribution area is narrower than the RGB color space, and includes both the gamut and areas surrounding it.

By the LUT writing section (data changing section) 307, the CMY image data (image data of the second color system) corresponding to each grid point contained in the distribution area selected by the gamut selecting section 306 is read out from the color space storing section 309 and is written over the LUT 304a. That is, by the LUT writing section 307, the CMY image data written in the LUT 304a is replaced with the CMY image data of the grid points contained in the distribution area.

More specifically, the data written in the LUT 304a by the LUT writing section (data changing section) 307 is not the data of all grid points in the RGB color space but is the data of all grid points in the gamut of the image data and areas surrounding the gamut.

By the position information changing section (position information changing section) 308, position information is generated for each grid point contained in the distribution area selected by the gamut selecting section 306, relative to the positions of these grid points in the RGB color space. The position information changing section 308 then overwrites the memory 304 with the generated position information. That is, by the position information changing section 308, the content of the position information 304b written in the memory 304 is replaced with information concerning a position of each grid point contained in the gamut of the inputted image.

Figure 8:
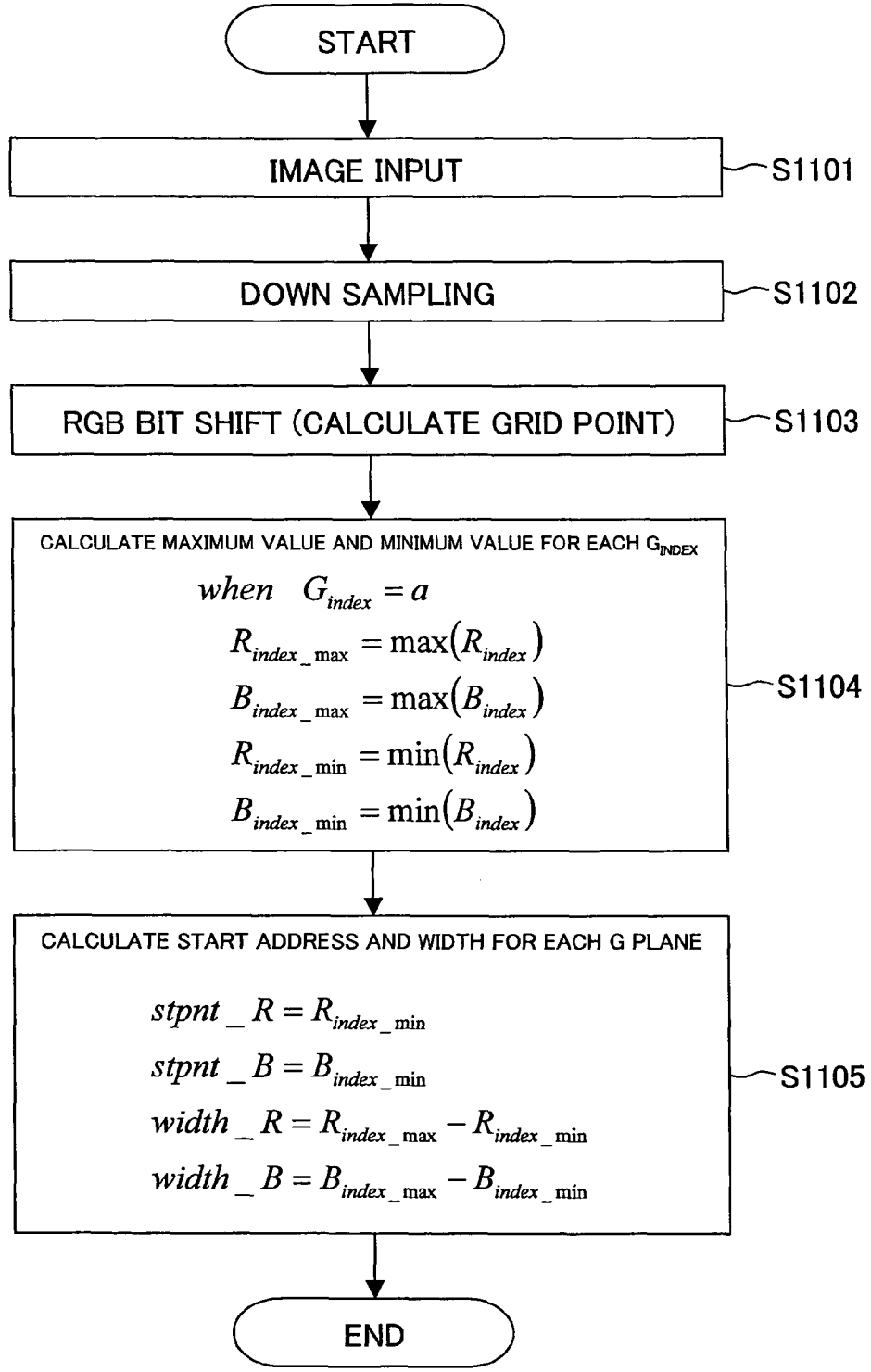
FIG. 8 is a flowchart showing a flow of a process performed by a grid point deciding section provided in the color converting section shown in FIG. 1.

With reference to the flowchart of FIG. 8, the following describes a flow of the procedures performed by the gamut selecting section 306, the LUT writing section 307, and the position information changing section 308.

First, the RGB image data (data indicative of the inputted image) is supplied to the gamut selecting section 307 (S1101), and the image data is reduced (down sampling) to the image size suited for the processing capability of the image processing apparatus 1 (S1102). Note that, down sampling in S1102 is optional.

Based on the down-sampled image data, the gamut selecting section 306 selects a gamut for the inputted image, from the RGB color space (S1103). The process is S1103 is described below in detail.

First, the inputted image data needs to be bit-shifted according to the number of unit cells set in the RGB color space. For example, when the image data is data of m bits, and when the number of unit cells along one coordinate axis of the color space is $2^n$ (m>n), upper n bits of the m-bit image data can be used to represent positions of corresponding grid points in the color space. The image data is therefore bit-shifted by m−n bits. That is, a set, $RGB_{index}$, of the grid points, corresponding to a set, $RGB_{data}$, of the m-bit image data can be represented by the following Formula (3).

$$RGB_{index} = RGB_{data} >> m-n \text{(right shift by m-n bits)} \quad (3)$$

That is, the gamut selecting section 306 determines $RGB_{data}$ as a gamut of the inputted image, and obtains $RGB_{index}$ from the $RGB_{data}$. The $RGB_{data}$ so obtained corresponds to the distribution area of the grid points corresponding to the inputted image.

Next, in all grid points of the $RGB_{index}$, grid points with a common green (G) value are sorted into one group, and distributions of red (R) and blue (B) are determined in this group. That is, the maximum and minimum values of red and blue are determined in all grid points contained in this group (S1104). The process of S1104 is performed for all values of green (G), and it proceeds according to the following Formula (4).

When $G_{index} = a$ $R_{index\_max} = \max(R_{index})$ $B_{index\_max} = \max(B_{index})$ $R_{index\_min} = \min(R_{index})$ $B_{index\_min} = \min(B_{index})$ \quad (4)

That is, the area surrounded by $R_{index\_max}$, $B_{index\_max}$, $R_{index\_min}$, and $B_{index\_min}$ in RB plane when $G_{index} = a$ corresponds to part of the distribution area of the grid points corresponding to the inputted image. By the LUT writing section 307, all grid points contained in the area surrounded by $R_{index\_max}$, $B_{index\_max}$, $R_{index\_min}$, and $B_{index\_min}$ in RB plane are specified as the grid points corresponding to the inputted image. The LUT writing section 307 then reads out CMY image data of the specified grid points from the color space storing section 309, and writes the data in the LUT 304a. The LUT writing section 307 performs this process for all $G_{index}$.

For each value of $G_{index}$, the position information changing section 308 determines start points (start addresses) and distribution widths of the grid points in RB plane (S1105). When start points are [stpnt_R, stpnt_B] and distribution widths are [width_R, width_B], stpnt_R = $R_{index\_min}$ stpnt_B = $B_{index\_min}$ width_R = $R_{index\_max} - R_{index\_min}$, and width_B = $B_{index\_max} - B_{index\_min}$ By the position information changing section 308, the stpnt_R, stpnt_B, width_R, width_B obtained for each value of $G_{index}$ are written in the memory 304, as the position information 304b concerning positions of the grid points contained in the distribution area (positions in the RGB color space) selected by the gamut selecting section 306. The position information 304b will be described later.

Figure 9:
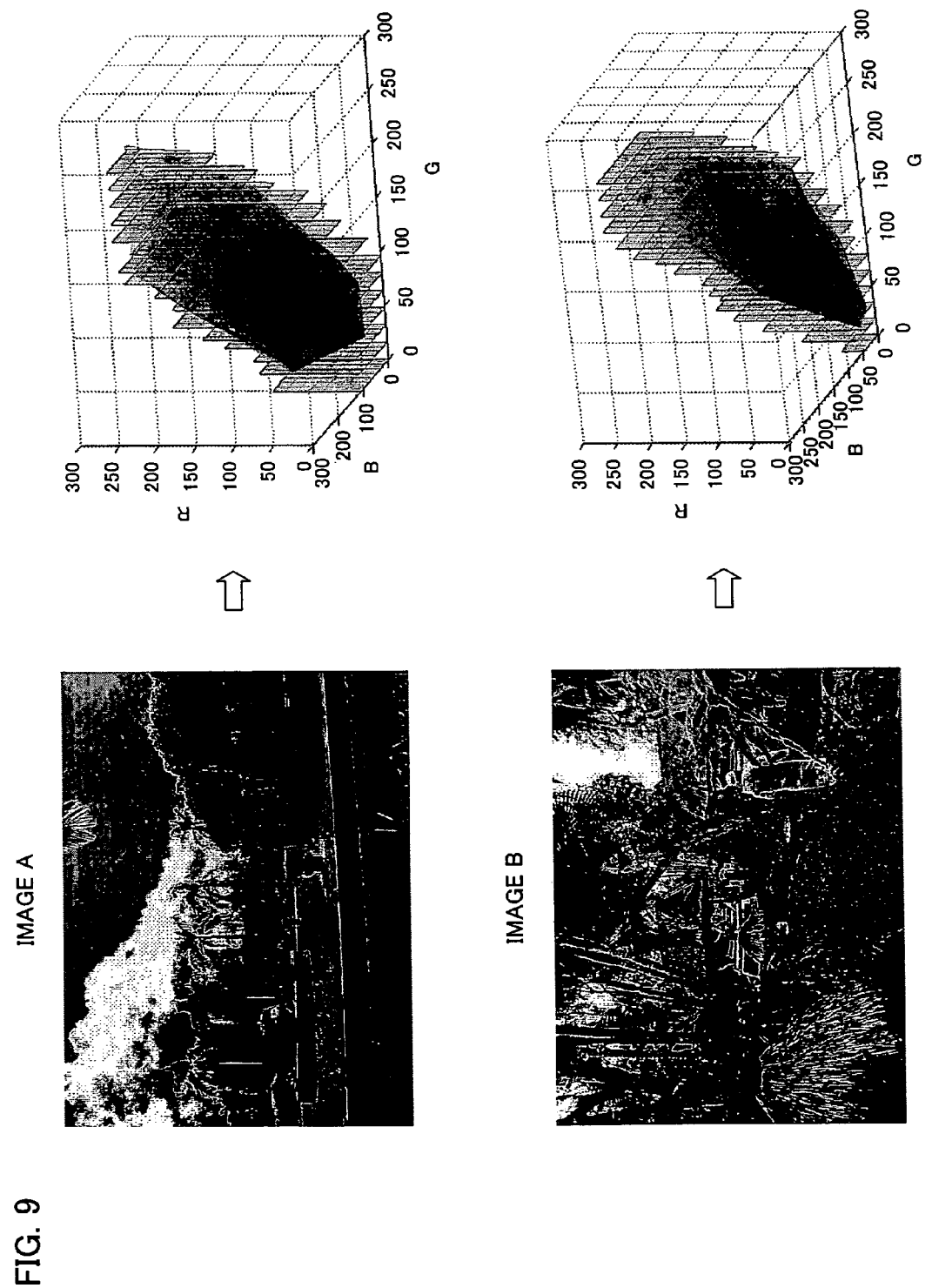
FIG. 9 is a diagram showing inputted images and distribution ranges of the inputted images in RB planes contained in RGB color spaces.

FIG. 9 is a schematic diagram showing an area surrounded by $R_{index\_max}$, $B_{index\_max}$, $R_{index\_min}$, $B_{index\_min}$ in RB plane (distribution area of the grid points corresponding to the inputted image), as obtained for each value of $G_{index}$ by the process of S1104. Table 2 below represents an example of the position information 304b for image A and image B shown in FIG. 9.

TABLE 2

| | Position information for image A<br>Total number of Grids: 1880<br>Ratio: 38.26% | | | | Position information for image B<br>Total number of Grids: 1479<br>Ratio: 30.10% | | | | |
|---|---|---|---|---|---|---|---|---|---|
| invec_G | stpnt_R | stpnt_B | width_R | width_B | invec_G | stpnt_R | stpnt_B | width_R | width_B |
| 0   | 1  | 1  | 8  | 6  | 0   | 1  | 1 | 5  | 3  |
| 16  | 1  | 1  | 8  | 7  | 16  | 1  | 1 | 8  | 4  |
| 32  | 1  | 1  | 10 | 8  | 32  | 1  | 1 | 10 | 5  |
| 48  | 1  | 1  | 11 | 10 | 48  | 1  | 1 | 11 | 6  |
| 64  | 1  | 1  | 13 | 11 | 64  | 1  | 1 | 11 | 7  |
| 80  | 1  | 1  | 13 | 11 | 80  | 1  | 1 | 10 | 8  |
| 96  | 1  | 1  | 14 | 11 | 96  | 2  | 1 | 9  | 9  |
| 112 | 2  | 1  | 15 | 11 | 112 | 2  | 1 | 11 | 9  |
| 128 | 4  | 1  | 13 | 10 | 128 | 3  | 1 | 11 | 9  |
| 144 | 5  | 1  | 12 | 10 | 144 | 4  | 1 | 11 | 10 |
| 160 | 6  | 2  | 11 | 10 | 160 | 5  | 1 | 11 | 10 |
| 176 | 8  | 4  | 9  | 8  | 176 | 6  | 1 | 11 | 11 |
| 192 | 9  | 5  | 8  | 10 | 192 | 7  | 3 | 10 | 10 |
| 208 | 9  | 8  | 8  | 7  | 208 | 8  | 5 | 9  | 8  |
| 224 | 11 | 9  | 6  | 7  | 224 | 10 | 6 | 7  | 6  |
| 240 | 12 | 12 | 5  | 4  | 240 | 12 | 8 | 5  | 4  |
| 255 | 12 | 12 | 5  | 4  | 255 | 12 | 8 | 5  | 4  |

For image A and image B, Table 2 represents start points and distribution widths of the grid points in RB plane, for each value of $G_{index}$. It can be seen from Table 2 that image A contains a total of 1880 grid points, and image B contains a total of 1479 grid points, showing that the number of required grid points varies depending on each type of interpolation process. In Table 2, the ratios indicate proportions with respect to the total of 4913 grid points.

The foregoing described the case where the grid points corresponding to the inputted image are specified by determining $R_{index\_max}$, $B_{index\_max}$, $R_{index\_min}$, and $B_{index\_min}$ for each value of $G_{index}$. However, this may alternatively be carried out by determining $R_{index\_max}$, $B_{index\_max}$, $R_{index\_min}$, and $G_{index\_min}$ for each value of $B_{index}$, or by determining $B_{index\_max}$, $G_{index\_max}$, $B_{index\_min}$, and $G_{index\_min}$ for each value of $R_{index}$.

The coordinates calculating section 302 selects grid points to be used for tetrahedral interpolation, and determines coordinates of the selected grid points. More specifically, the coordinates calculating section 302 determines differences in magnitude of RGB in the RGB image data supplied to the color converting section 201, and, based on the differences, selects $P_P$, $P_S$, $P_K$, and $P_W$ at the apices of the tetrahedron, according to Table 1. The coordinates calculating section 302 then calculates coordinates of the selected $P_P$, $P_S$, $P_K$, $P_W$ in the RGB color space, and outputs the result to the address calculating section 303 of the next stage. That is, by the coordinates calculating section 302, the coordinates of $P_P$, $P_S$, $P_K$, $P_W$ corresponding to the input RGB image data are outputted to the address calculating section 303.

The information as shown in Table 1 can be used by the coordinates calculating section 302 in several different ways. For example, the coordinates calculating section 302 may be provided with a memory that stores tetrahedron information representing correspondence between differences in RGB signals and apices of the tetrahedrons, as shown in Table 1, and the selection of the tetrahedron apices $P_P$, $P_S$, $P_K$, $P_W$ may be made by reading the tetrahedron information by the coordinates calculating section 302. Alternatively, the coordinates calculating section 302 may use a program by which tetrahedron apices can be selected according to differences in RGB signals.

The coordinates calculating section 302 calculates coordinates of the selected apices $P_P$, $P_S$, $P_K$, $P_W$ as follows.

As shown in FIG. 4, point $P_K$ has the smallest coordinates among the apices of the tetrahedron to which the inputted image data belong. In the present embodiment, the RGB color space has 16 unit cells along each axis that takes the value of 0 to 255, and the position of each grid point is specified by the coordinates of 0 to 16.

As such, the coordinate calculating section 302 can determine the coordinates of $P_K$ using the upper 4 bits of the inputted image data that takes the value of 0 to 255. When the inputted image data (R, G, B) is (invec[0], invec[1], invec[2]), the coordinates calculating section 302 calculates the coordinates (ivec[0], ivec[1], ivec[2]) of point $P_K$ according to the following Formula (5).

$$ivec=invec>>4 \text{(right-shift by 4 bits)} \quad (5)$$

Based on the coordinates of $P_K$ so determined, the coordinates calculating section 302 calculates coordinates of the other three points ($P_S$, $P_K$, $P_W$). Specifically, as shown in FIG. 4(a), the coordinates of points $P_W$, $P_R$, $P_G$, $P_B$, $P_C$, $P_M$, and $P_Y$ are determined as follows.

$P_W$: adding 1 to each value of the $P_K$ coordinates
$P_R$: adding 1 to R value of the $P_K$ coordinates
$P_G$: adding 1 to G value of the $P_K$ coordinates
$P_B$: adding 1 to B value of the $P_K$ coordinates
$P_C$: adding 1 to G and B values of the $P_K$ coordinates
$P_M$: adding 1 to R and B values of the $P_K$ coordinates
$P_Y$: adding 1 to R and G values of the $P_K$ coordinates That is, the coordinates calculating section 302 adds 1 to each value of $P_K$ coordinates (ivec[0], ivec[1], ivec[2]) to yield $P_W$ coordinates (ivec[0]+1, ivec[1]+1, ivec[2]+1). Similarly, the coordinates calculating section 302 calculates coordinates of points selected as points $P_P$ and $P_S$, based on the $P_K$ coordinates.

As described above, based on differences in magnitude of the RGB signals, the coordinates calculating section 302 selects points $P_P$ and $P_S$ and calculates coordinates of $P_K$, $P_W$, $P_P$, $P_S$. The coordinates calculating section 302 then outputs the results to the address calculating section 303 of the next stage.

From the LUT 304a, the address calculating section 303 reads CMY image data of the grid points corresponding to the RGB image data that has been supplied to the color converting section 201, and sends the CMY image data to the interpolation operating section 305.

To describe more specifically, based on the position information 304b and the coordinates of the four grid points (grid points corresponding to the input RGB image data) outputted by the coordinates calculating section 302, the address calculating section 303 calculates addresses to be accessed in the LUT 304a. By making access to the LUT 304a, the address calculating section 303 reads out the CMY image data (corresponding to the grid points $P_K$, $P_W$, $P_P$, $P_S$) stored in these addresses, and sends the data to the interpolation operating section 305. As to the method of calculation performed by the address calculating section 303, detailed description will be given later.

The weight calculating section 301 is used when the interpolation operating section 305 performs the interpolation operation. The weight calculating section 301 calculates weights for the inputted image data, and sends the result to the interpolation operating section 305. Based on the RGB image data supplied to the color converting section 201, the weight calculating section 301 calculates the fractions fR, fG, and fB according to Formula (1). Further, the weight calculating section 301 determines differences in magnitude of the RGB signals, and determines weighting constant values bk, bW, bP, bS based on the fractions fR, fG, fB and Table 1. The weight calculating section 301 then sends the weighting constant values bk, bW, bP, bS to the interpolation operating section 305.

The interpolation operating section (interpolating section) 305 performs interpolation based on the CMY image data read out from the LUT 304a, so as to output the CMY image data corresponding to the RGB image data that was supplied to the color converting section 201.

To be more specific, the interpolation operating section 305 performs interpolation based on the weighting constant values supplied from the weight calculating section 301, and the CMY image data read out from the LUT 304a. Specifically, the interpolation operating section 305 performs tetrahedral interpolation by substituting the CMY image data into corresponding points $P_K$, $P_W$, $P_P$, $P_S$ of Formula (2). The interpolation operating section 305 then outputs operation result P to the black generation and undercolor removal section 202 of the next stage, as the CMY image data corresponding to the RGB image data that was supplied to the color converting section 201.

According to the foregoing structure, the interpolation operating section 305 performs the interpolation process based on data read out from the LUT 304a. It should be noted here that the LUT 304a does not store data of all grid points contained in the RGB color space, but it stores only data in the distribution area of the grid points corresponding to the inputted image (data of grid points contained in the gamut of the inputted image, and data of grid points in areas surrounding the gamut), so that points (image data) contained in the gamut of the inputted image can be generated by interpolation.

This enables the LUT 304a to exclude data of grid points that are not required for the interpolation of each different inputted image. As a result, memory space can be reduced as compared with the structure in which interpolation is performed by referring to a memory in which data of specific numbers of grid points are stored. In this way, the processing capability (for example, operation speed) of the image processing apparatus 1 can be improved.

The grid points corresponding to the inputted image reside in the gamut of the inputted image and areas surrounding the gamut. Other grid points are not necessary for the interpolation process. Thus, when the distribution area of the grid points corresponding to the inputted image is selected based on the gamut of the inputted image as in the foregoing structure, data of grid points that are not required for the interpolation process can easily be excluded from the memory.

The following describes how the CMY image data of each grid point contained in the distribution area of the grid points corresponding to the inputted image is written in the LUT 304a.

Figure 10:
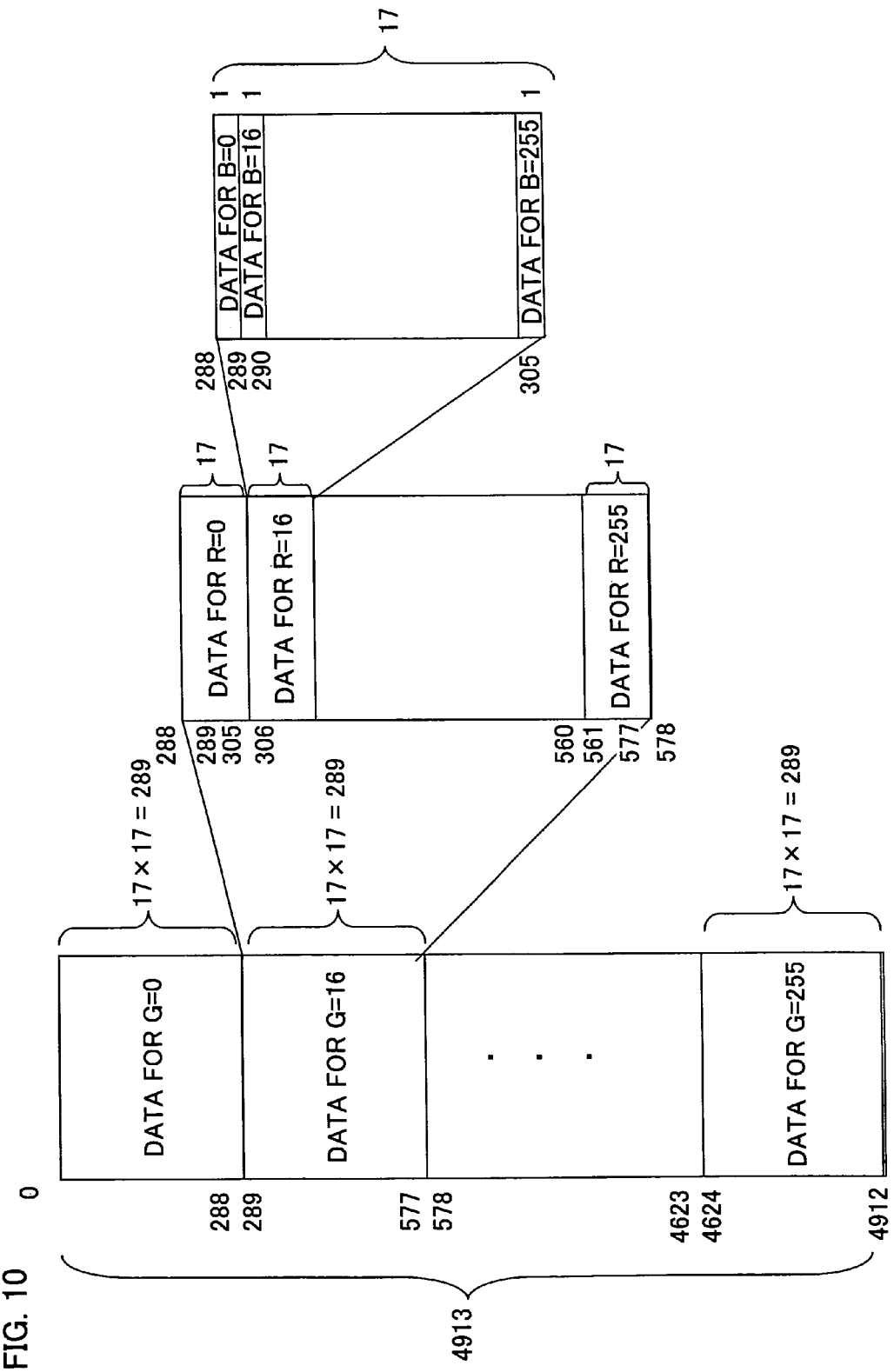
FIG. 10 is a diagram showing an example in which grid point data is stored in a memory according to a conventional technique.
Figure 11:
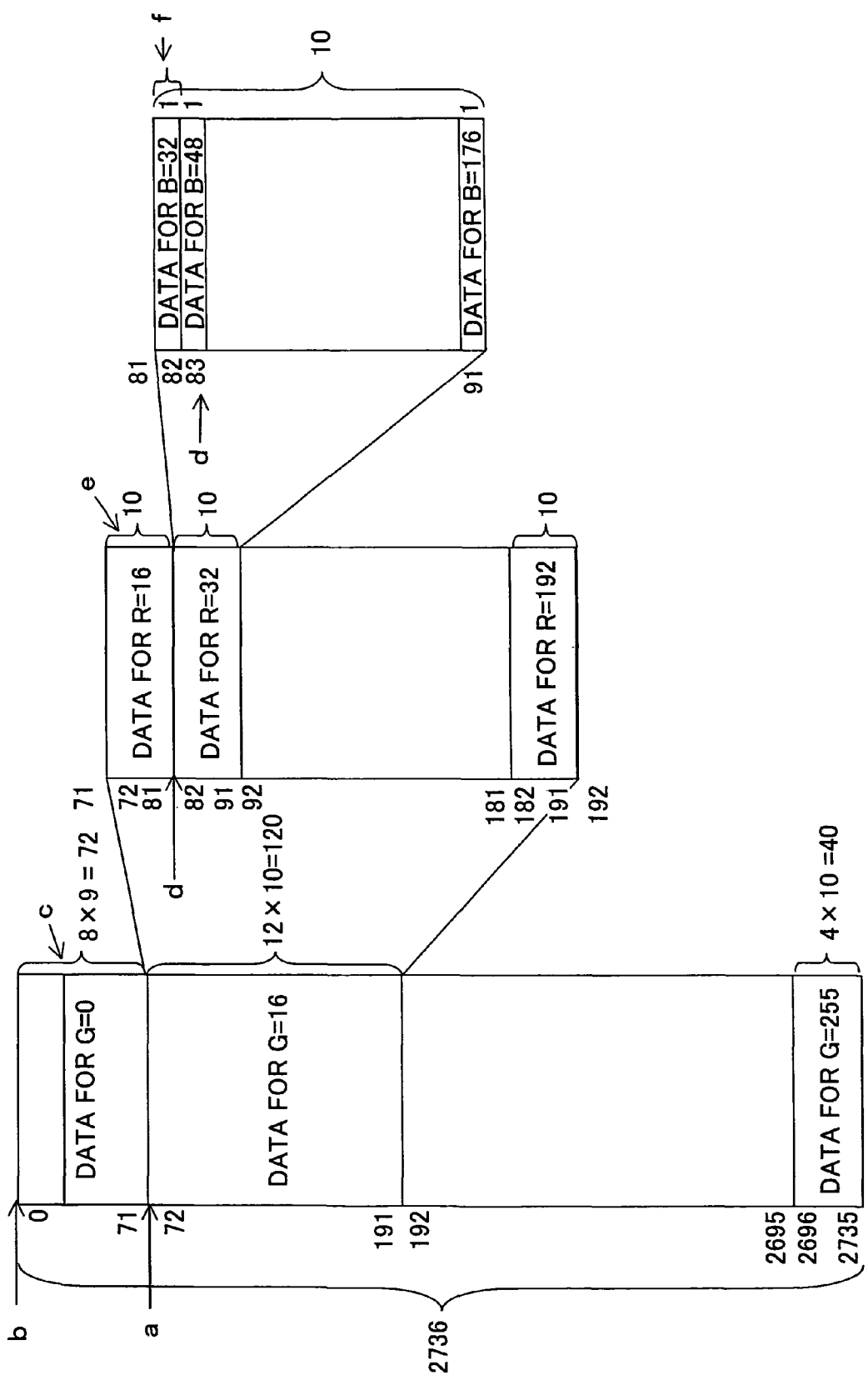
FIG. 11 is a diagram showing an example in which grid point data selected according to one embodiment of the present invention is stored in a memory.

As shown in FIG. 10, CMY signal data corresponding to the grid points contained in RB plane is stored for each value of G, in the order from G=0, 16, . . . 255. For each value of G, CMY signal data corresponding to the grid points are stored in the order from R=0, 16, 255. For each value of R, CMY signal data corresponding to the grid points are stored in the order from B=0, 16, 255. FIG. 10 represents a conventional example in which all grid points are stored in the LUT. FIG. 11 represents an example according to the present embodiment, in which the LUT 304a stores only the data of grid points contained in the distribution area of the grid points corresponding to the inputted image. As shown in FIG. 11, the LUT 304a of the present embodiment linearly stores data corresponding to addresses 0 to 2735, in order to allow for easy access by the address calculating section 303.

The following describes how address calculation is made by the address calculating section 303.

As represented in Table 2, the position information 304b generated by the position information changing section 308 and written in the memory 304 is indicative of position information of all grid points (positions in the RGB color space) contained in the distribution area of the grid points corresponding to the inputted image, and is defined by the start points [stpnt_R, stpnt_B] and distribution widths [width_R, width_B] in the RB plane of each G value. That is, the position information in RB plane indicates start points of the distribution area along R axis and B axis, and distribution widths of the grid points along R axis and B axis. The CMY image data corresponding to each grid point represented by the position information 304b is written in the LUT 304a.

For example, referring to Table 2, the position information for image A has start points (1, 1) (R, B) in the RB plane for G=80. Thus, the CMY image data corresponding to each grid point is written in the LUT 304a from R=16 and B=16. Further, since distribution widths are 13 and 11 along R axis and B axis respectively, the LUT 304a stores the CMY image data of grid points to R=208 and G=176.

Storing the position information 304b in the LUT 304a is advantageous because it makes it easier for the address calculating section 303 to perform address calculation when it accesses the LUT 304a.

The following specifically describes how the address calculating section 303 performs address calculation using the position information 304b.

From the coordinates calculating section 302, the address calculating section (reading section) 303 acquires coordinates of each grid point at the apices of the tetrahedron, as described above. For example, when the RGB signals of the inputted image data are related to one another by R>G>B, the address calculating section 303 acquires $P_K$ coordinates (ivec[0], ivec[1], ivec[2]), $P_W$ coordinates (ivec[0]+1, ivec[1]+1, ivec[2]+1), $P_R$ coordinates (corresponding to $P_P$ coordinates) (ivec[0]+1, ivec[1], ivec[2]), and $P_Y$ coordinates (corresponding to $P_S$ coordinates) (ivec[0]+1, ivec[1]+1, ivec[2]). The following description will be given through the case where the address calculating section 303 calculates an address corresponding to point $P_K$; however, the address calculating section 303 can similarly calculate corresponding addresses for other points as well.

Next, in order to determine whether the grid point with the acquired coordinates belongs to which RB plane, the address calculating section 303 calculates address stp1 from the acquired coordinates. The address calculating section 303 can determine address stp1 by determining a sum of products for i=0 to (ivec[1]-1) according to Formula (6) below. Here, the address calculating section 303 performs the calculation referring to the position information 304b (specifically as represented in Table 2) stored in the memory 304.

$$stp1 = \text{stp\_adress} + \sum_{0}^{ivec[i]-1} \{(\text{width\_R}(i)) \times (\text{width\_B}(i))\} - 1 \quad (6)$$

In Formula (6), width_R(i) represents a width of grid points (along R axis) in the position information 304b (see Table 2), and width_B(i) represents a width of grid points along B axis. Further; stp_address represents a start address of the LUT 304a. Referring to FIG. 11, ivec [1] is 1 when it is 16 to 31 (00010000 to 00011111 in binary representation, or 1 when upper 4 bits are extracted (right shift by 4 bits)). In this case, arrow a in FIG. 11 indicates the address, and the second term of Formula (6) represents a width of c in FIG. 11. That is, in this case, the grid point belongs to RB plane for G=16.

Next, the address calculating section 303 calculates a location of the address in a group of data of the grid point obtained for G=16. Further, by taking advantage of the rectangular shape of the RB plane, the address calculating section performs further calculations with address stp1. The address calculating section 303 determines stp2 according to the following Formula (7).

$$stp2 = stp1 + (ive[0] - stpnt\_R(ive[1])) \times \text{width\_}B(ive[1]) + (ive[2] - stpnt\_B(ive[1]))) \quad (7)$$

In Formula (7), stpnt_R(i) represents a start point (along R axis) in the position information (see Table 2), and stpnt_B(i) represents a start position along B axis. Referring to FIG. 11, when invec[0] is 32 to 47, i.e., ivec[0]=2, the address calculating section 303 determines the second term of Formula (6) to yield a width of e shown in FIG. 11. When invec[2] is 48 to 53, i.e., ivec[2]=3, the address calculating section 303 determines the third term of Formula (6) to yield a width of f shown in FIG. 11. By adding the results, the address calculating section 303 calculates the final address as indicated by d in FIG. 11.

That is, based on the position information 304b and a G signal value of the coordinates of the grid point $P_K$, the address calculating section 303 first determines whether the inputted image data belongs to RB plane of which G value (G=0, 16, . . . 255). The address calculating section 303 then calculates a position of the grid point $P_K$ in the RB plane to obtain the final address, using R and B signal values of the coordinates of the grid point $P_K$, together with the position information 304b.

By specifying the final address corresponding to the grid point $P_K$, the address calculating section 303 accesses the three-dimensional LUT 304a, and sends the CMY data stored in the specified address to the interpolation operating section 305. In the same manner, the address calculating section 303 sends corresponding CMY data of points $P_W$, $P_P$, and $P_S$ to the interpolation operating section 305.

Second Embodiment

The foregoing First Embodiment described the case where the grid points contained in the gamut of the inputted image are written in the LUT. The present embodiment describes changing the number of grid points in a color space according to various conditions.

Figure 12:
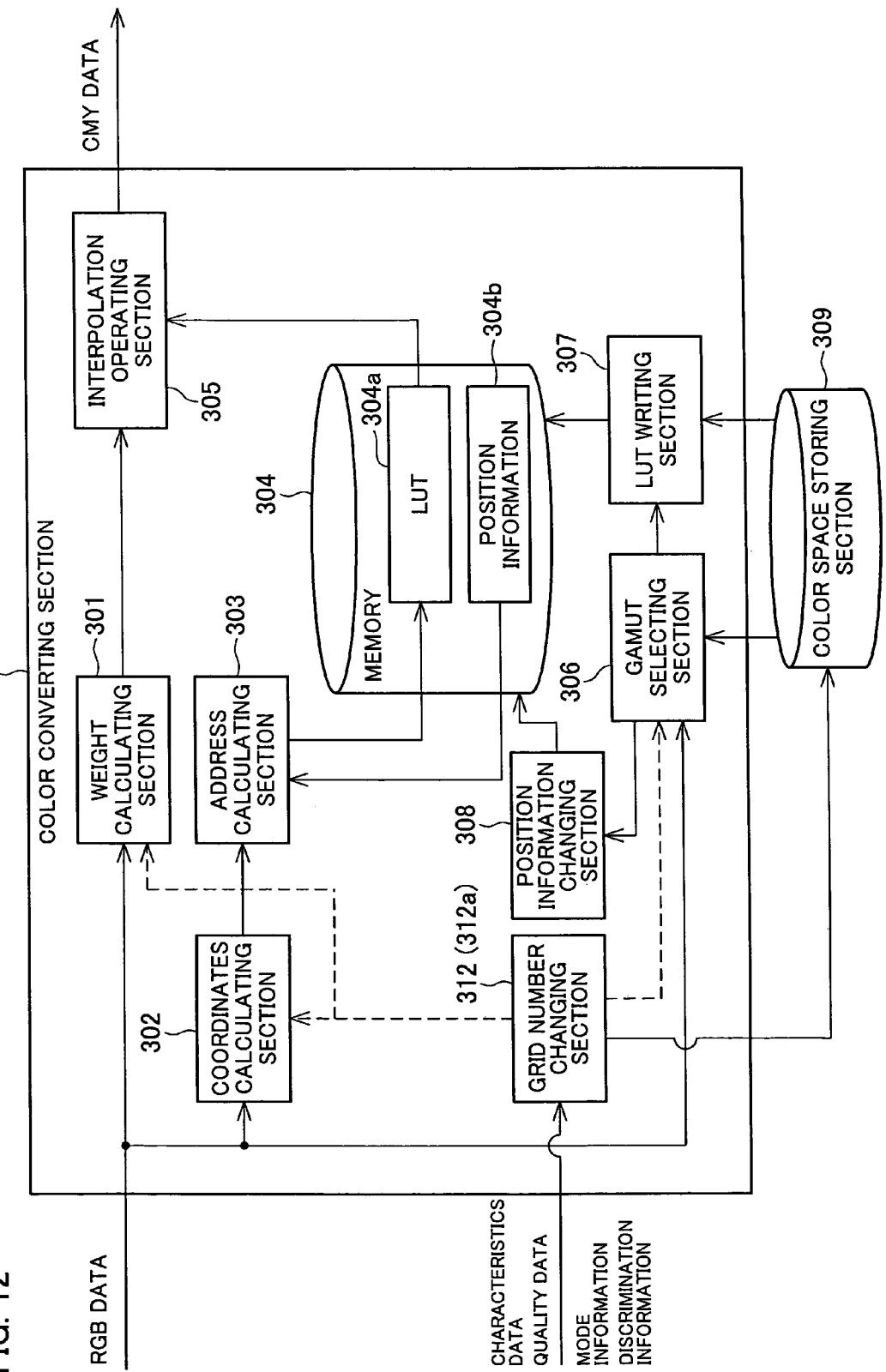
FIG. 12 is a block diagram showing a schematic structure of a color converting section according to another embodiment of the present invention.

First, detailed description is made as to a structure of a color converting section 201a according to the present embodiment. FIG. 12 is a block diagram showing a structure of the color converting section 201a of the present embodiment. As shown in FIG. 12, the color converting section 201a includes a weight calculating section 301, a coordinates calculating section 302, an address calculating section 303, a memory 304, an interpolation operating section 305, a gamut selecting section 306, a LUT writing section 307, a position information changing section 308, a color space storing section 309, and a grid number changing section (grid number changing section) 312.

In the following, no detailed description will be made for the weight calculating section 301, the coordinates calculating section 302, the address calculating section 303, the memory 304, the interpolation operating section 305, the gamut selecting section 306, the LUT writing section 307, the position information changing section 308, and the color space storing section 309, because these elements are structurally the same as or similar to those described in the First Embodiment.

The grid number changing section 312 externally obtains quality data indicative of a quality of an inputted image or output image. According to the quality data so obtained, the grid number changing section 312 determines the number of divisions $2^n$ (for example, 8, 16, 32, 64, etc.) of the coordinate axes of the color space stored in the color space storing section 309. Then, the grid number changing section 312 divides each coordinate axis of the color space (RGB color space stored in the color space storing section 309) by the number of divisions $2^n$. The grid number changing section 312 then calculates CMY image data corresponding to each grid point resulting from the division, and stores the resulting CMY image data by corresponding it to the color space storing section 309.

The foregoing First Embodiment uses only the color space in which each coordinate axis is divided into 16 units. In the present embodiment, the number of divisions $2^n$ for the color space stored in the color space storing section 309 can be changed according to the quality data. By changing the number of divisions, it is possible to change the width of unit cells in the color space and the number of unit cells occupying the color space.

Note that, in the following, description will be given through the case where the quality data obtained by the grid number changing section 213 is resolution information indicative of the resolution of an inputted image. The resolution of an inputted image is selected by a user as one of the reading conditions of the image input apparatus (scanner, for example) 2, using the operation panel 5 of the image forming apparatus 4, or an input section (keyboard, mouse, etc.) of a terminal device. That is, the resolution information obtained by the grid number changing section 312 is entered through, for example, the operation panel 5 of the image forming apparatus 4.

The "resolution" is a measure of image graininess or smoothness of an image, i.e., it is a parameter representing a unit width as a collection of points. In printers and scanners, the resolution is generally expressed by the number of dots/inch, with the unit dpi (dots per inch). Higher resolutions provide high-quality images that look more natural. When resolutions are low, smoothness of images and texts suffer and image quality deteriorates. Thus, when an inputted image has low resolutions (for example 300 dpi or 600 dpi), the image is recognized as being of poor quality that does not require accurate interpolation. On the other hand, when the resolution is high (for example, 1200 dpi or 2400 dpi), a high quality image (accurate interpolation) is needed.

Upon detecting that the process in the grid number changing section 312 has been finished, processes similar to those described in the First Embodiment are performed by the gamut selecting section 306, the LUT writing section 307, and the position information changing section 308 (S1101 to S1105 in FIG. 8). However, in S1103, the gamut selecting section 306 bit shifts m-bit inputted image data by m–n bits, according to the number of divisions $2^n$ as determined by the grid number changing section 312.

From the color space storing section 309, the gamut selecting section 306 refers to the RGB color space that has the specific number of divisions $2^n$ as decided by the grid number changing section 312, and a gamut corresponding to the inputted image is selected from the color space. From the color space storing section 309, the LUT writing section 307 reads CMY data of each grid point contained in the gamut that has been selected from the RGB color space by the gamut selecting section 306. The LUT writing section 307 then writes the data in the LUT 304a. That is, in the present embodiment, the data of each grid point written in the LUT 304a is the data of grid points contained in the RGB color space that has the number of divisions $2^n$ as decided by the grid number changing section 312.

Note that, the coordinates calculating section 302 calculates coordinates of point $P_K$ (ivec[0], ivec[1], ivec[2]) according to the number of divisions $2^n$ decided by the grid number changing section 312. The calculation is made according to Formula (5)' below.

$$ivec = invec >> n \text{(right shift by n bits)} \quad (5)'$$

The weight calculating section 301 calculates weights, after changing the values of $(x_1-x_0)$, $(y_1-y_0)$, $(z_1-z_0)$ in Formula (1) according to the number of divisions $2^n$ decided by the grid number changing section 312.

The interpolation performing section 305 then executes the interpolation operation based on the data of the grid points written in the LUT 304a.

The following describes the grid number changing section 312 in more detail. As described above, the grid number changing section 312 changes the number of divisions $2^n$ in each coordinate axis of the color space stored in the color space storing section 309, according to the resolution information indicative of the resolution of the inputted image.

Specifically, the grid number changing section 312 includes a table of correspondence between resolution information, indicative of image resolution, and the number of divisions $2^n$. In the table, the resolution information and the number of divisions preferably correspond to each other with a positive correlation. Upon acquiring the resolution information through the operation panel 5 or the like, the grid point changing section 312 refers to the table and reads therefrom the number of divisions $2^n$ that corresponds to the acquired resolution information. Based on the number of divisions $2^n$ so read out, the grid number changing section 312 changes the number of divisions of each coordinate axis of the color space stored in the color space storing section 309, and thereby changes the number (and accordingly width) of unit cells in the color space.

Increasing the number of divisions increases the number of unit cells (decreases the width of unit cells) in the color space. There accordingly will be an increase in the number of grid points per unit space. This realizes an accurate interpolation process. On the contrary, decreasing the number of divisions decreases the number of unit cells (increases the width of unit cells) in the color space and therefore decreases the number of grid points per unit space. This decreases the number of grid points written in the memory, and as a result saves the memory space.

That is, the foregoing structure enables the number of unit cells in the color space to be changed according to information indicative of the resolution or other qualities of the inputted image, and thereby realizes an interpolation process that is suited for the quality of the inputted image. Specifically, the following control is performed. For a high-resolution image that requires accurate interpolation, the number of divisions and therefore the number of unit cells in the color space is increased to realize accurate interpolation. For a low-resolution image that does not require accurate interpolation, the number of divisions and therefore the number of unit cells in the color space is decreased to save memory space.

According to the foregoing structure, the grid number changing section 312 acquires the resolution information that has been entered through the operation panel or the like of the image forming apparatus 4. The resolution information is entered through the operation panel 5 by a service person or a user, when the resolution of the scanner in the image input apparatus 2 is changed, or when the image input apparatus 2 is newly connected.

In the present embodiment, the relationship between the resolution information, indicative of image resolutions, and the number of divisions $2^n$ is stored in the table. The table may be adapted so that a user can suitably rewrite the content of the table. Further, instead of storing the relationship between the image resolution and the number of divisions $2^n$ in the table, recommended values of $2^n$ for given image resolutions may be displayed in the operation panel 5 to allow a service person or a user to select a suitable value of $2^n$.

The grid number changing section 312 is able to acquire the resolution information also for an inputted image that has been downloaded via a network. For example, in the common image format TIFF (Tagged Image File Format), the resolution information can be obtained from the information of the header, which contains resolution information.

In the present embodiment, the grid number changing section 312 changes the number of grid points in the color space by changing the number of divisions $2^n$ of the color space stored in the color space section 309. However, the ways the number of grid points is changed are not just limited to this example. The number of divisions of the coordinate axes in the color space is not limited to $2^n$.

For example, the number of grid points in the color space may be changed without changing the width of unit cells in the color space. Specifically, the grid number changing section 312 may set any value for the number of grid points along a coordinate axis, while maintaining a constant width for the unit cells in the RGB color space.

Figure 14:
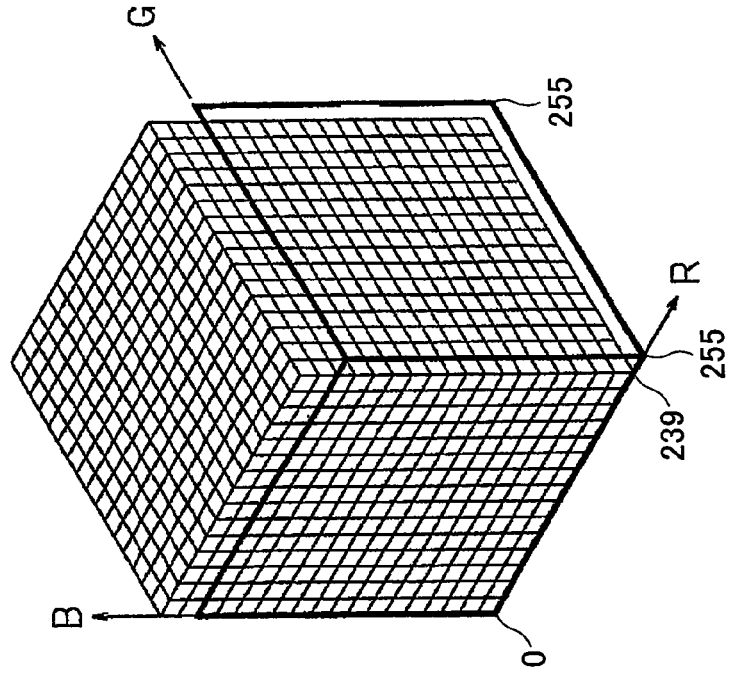
FIGS. 14(a) and 14(b) are conceptual views showing RGB color spaces in which the number of grid points can be changed without changing the width of unit cells.
Figure 14:
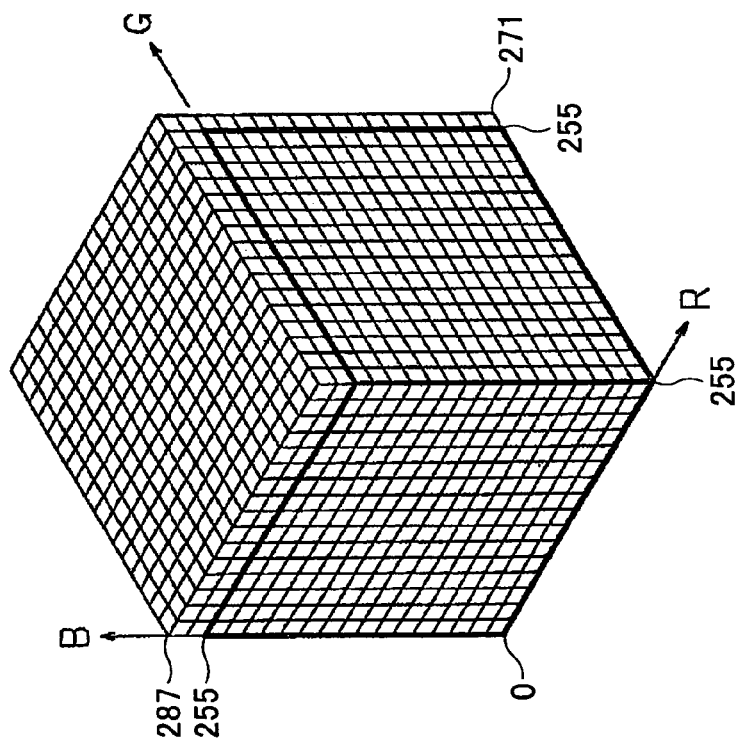

The following describes this with reference to FIGS. 14(a) and 14(b). In FIG. 14(a), areas surrounded by solid lines define an RGB color space in which each coordinate axis can take the value of 0 to 255, and in which 17 grid points (the number of divisions $2^4$=16) are set along each coordinate axis. For example, relative to the color space surrounded by the solid lines, one unit cell may be added along the G coordinate axis to increase the number of grid points along this coordinate axis from 17 to 18 (the number of divisions=17) and thereby set the range of coordinate axis for G from 0 to 271, the number of grid points in the color space can be increased without changing the width of the unit cells. Further, for example, two unit cells may be added along the B coordinate axis to increase the number of grid points along this coordinate axis from 17 to 19 (the number of divisions=18) and thereby set a range of coordinate axis for B from 0 to 287, the number of grid points in the color space can be increased without changing the width of the unit cells.

Instead of increasing the number of grid points, the number of grid points may be decreased as well. For example, as shown in FIG. 14(b), one unit cell may be subtracted along the R coordinate axis to decrease the number of grid points along this coordinate axis from 17 to 16 (the number of divisions=15) and thereby set a range of coordinate axis for R from 0 to 239. In this way, the number of grid points can be decreased without changing the width of the unit cells.

That is, the grid number changing section 312 can also change the number of grid points in the color space by adding or subtracting one or more unit cells along a coordinate axis in the color space, according to the resolution information indicative of the inputted image.

For example, the grid number changing section 312 stores a table of correspondence between (i) the resolution information indicative of image resolutions, and (ii) grid point data indicative of the number of grid points (any integer between 10 to 32, for example) along each coordinate axis. From the table, the grid number changing section 312 reads grid point data that corresponds to the resolution information obtained through the operation panel 5 or the like. The grid number changing section 312 then adds or subtracts a unit cell(s) to/from a coordinate axis in the RGB color space, so that the number of grid points in the coordinate axis of the RGB color space is equal to the number of grid points that has been set for this coordinate axis by the grid point data read out from the table. In this way, the number of grid points can be changed according to the resolution of inputted image, without changing the width of the unit cells.

However, in this case, the numerical range of the inputted image data needs to match that of each coordinate axis in the RGB color space. To this end, there needs to be provided, on a preceding stage of the color converting section 201, a numerical range converting section for converting a possible numerical range of the inputted image data supplied to the color converting section 201, so that the numerical range of the inputted image data matches that of each coordinate axis in the RGB color space.

Figure 15:
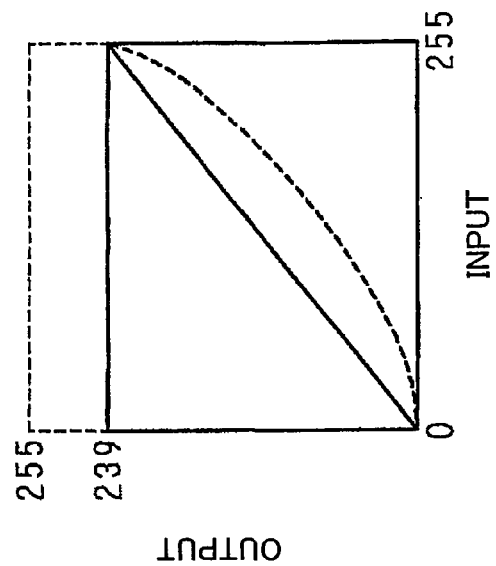
FIGS. 15(a) and 15(b) is a schematic view showing a table used for converting a possible numerical range of the inputted image data.
Figure 15:
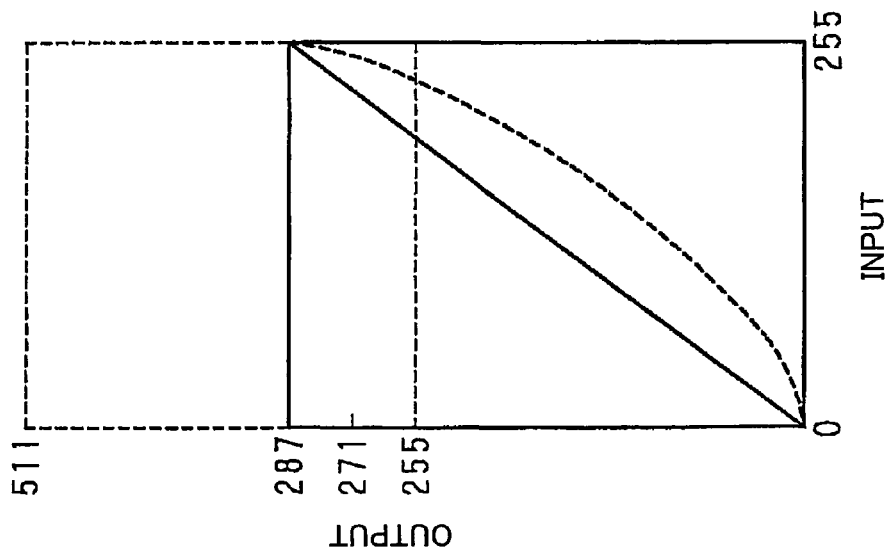

For example, when the inputted image data is 8-bit data that takes the value of 0 to 255 and when the grid number changing section 312 has changed the number of grid points along the B coordinate axis to 19 and the numerical range of the B coordinate axis to 0 to 287 as shown in FIG. 14(a), the bit number changing section converts the number of bits of the inputted image data for B from 8 bits to 9 bits and thereby changes the numerical range of the inputted image data to 0 to 287, using the table as shown in FIG. 15(a).

Further, when the inputted image data is 8-bit data that takes the value of 0 to 255 and when the grid number changing section 312 has changed the number of grid points along the R coordinate axis to 16 and the numerical range of the R coordinate axis to 0 to 239 as shown in FIG. 14(b), the bit number converting section converts the numerical range of the inputted image data for R to 0 to 239, using the table as shown in FIG. 15(b), because the range 0 to 239 can be expressed in 8 bits.

Note that, as described in the present embodiment, the number of unit cell in the color space is changed according to the resolution of the inputted image; however, the number of unit cells in the color space may be changed according to other conditions as well. The following describes such implementations in which the number of unit cells is changed according to other conditions.

(Change According to Image Size)

The accuracy of the interpolation process needs to be increased as the size of a final printed image is increased. This is necessary to prevent the quality of a printed image from being deteriorated.

To prevent such deficiencies, the size information indicative of a size of the image data outputted by the image processing apparatus 1 (size of an output image) is obtained as the quality data by the grid number changing section 312. The grid number changing section 312 includes a table of correspondence between size information, indicative of image size, and the number of divisions $2^n$. In the table, the size information and the number of divisions preferably correspond to each other so that there is a positive correlation between image size and the number of divisions $2^n$.

In this way, the grid number changing section 312 acquires size information that indicates the size of image data outputted by the image processing apparatus 1. From the table, the grid number changing section 312 then reads out the number of divisions $2^n$ corresponding to the acquired size information. Based on the number of divisions $2^n$ so read out, the grid number changing section 312 changes the number of divisions of each coordinate axis in the color space stored in the color space storing section 309. This changes the number of unit cells in the color space, and the width of the unit cells.

In this manner, the number of unit cells in the color space is changed according to the size of an output image. As a result, an interpolation process is realized that is suited for the size of an output image. Specifically, the following control is performed. For a large image that requires accurate interpolation, the number of divisions $2^n$ and therefore the number of unit cells in the color space is increased to realize accurate interpolation. For a small image that does not require accurate interpolation, the number of divisions $2^n$ and therefore the number of unit cells in the color space is decreased to save memory space.

The size of an output image can be calculated from the number of pixels in the inputted image (size of inputted image), and the resolution of the output device. For example, when the number of pixels of the inputted image is 1200×600 (height×width) and the resolution of the output image is 300 DPI, the size of output image is given by 1200/300=4 inch vertical, and 600/300=2 inch horizontal. When the resolution of an output image is 600, the size of an output image is given by 1200/600=2 inch vertical, and 600/600=1 inch horizontal. In this manner, the size of an output image can be calculated when the resolution of the output device and the number of pixels in the inputted image are known.

To this end, the image processing apparatus 1 includes a size calculating section (not shown) which, based on the number of pixels in the inputted image and the resolution set in the image output apparatus 3, calculates size information indicative of the size of an output image. The grid number changing section 312 then acquires the size information, indicative of output image size, from the size calculating section.

(Change According to the Print Resolution of the Image Output Apparatus)

The number of unit cells in the color space may be set according to the print resolution of the image output apparatus 3 connected to the image processing apparatus 1. For example, when the print resolution of the image output apparatus 3 is low and the resolution quality of image is not a first priority, the number of unit cells set in the color space is decreased to save memory space. On the contrary, when the print resolution of the image output apparatus 3 is high and high resolution quality is required for the image, the number of unit cells in the color space is increased to realize accurate interpolation.

Specifically, the grid number changing section 312 obtains resolution information (quality data) indicative of the print resolution set in the color space. Note that, the print resolution is selected by a user as one of the print conditions of the image output apparatus (printing apparatus) 3, using the operation panel 5 or an input section (keyboard or mouse) of the image processing apparatus 1. That is, the resolution information obtained by the grid number changing section 312 is the resolution information entered through the operation panel 5 or the like of the image processing apparatus 1.

The grid number changing section 312 includes a table of correspondence between the resolution information, indicative of the print resolution, and the number of divisions $2^n$. In the table, the resolution information and the number of divisions preferably correspond to each other such that there is a positive correlation between the print resolution and the number of divisions $2^n$.

In this way, the grid number changing section 312 acquires resolution information that indicates the print resolution set in the image output apparatus 3. From the table, the grid number changing section 312 then reads out the number of divisions $2^n$ corresponding to the acquired resolution information. Based on the number of divisions $2^n$ so read out, the grid number changing section 312 changes the number of divisions of each coordinate axis in the color space stored in the color space storing section 309. This changes the number of unit cells in the color space, and the width of the unit cells.

In this manner, the number of unit cells in the color space is changed according to the print resolution of the image output apparatus 3. As a result, an interpolation process is realized that is suited for the print resolution. Specifically, the following control is performed. For a high print resolution image that requires accurate interpolation, the number of divisions $2^n$ and therefore the number of unit cells in the color space is increased to realize accurate interpolation. For a low print resolution image that does not require accurate interpolation, the number of divisions $2^n$ and therefore the number of unit cells in the color space is decreased to save memory space.

(Change According to Segmentation Class Information)

Generally, an inputted image made up of text areas does not have many colors and rarely requires accurate interpolation. This allows the number of unit cells in the color space to be decreased and saves memory space (the number of divisions or unit cells in each coordinate axis in the color space can be decreased to about 8 (9 grid points)).

An inputted image made up of halftone areas and photographic areas (continuous tone areas) requires accurate interpolation. It is therefore preferable to increase the number of unit cells set in the color space (for example, the number of divisions or unit cells in each coordinate axis is preferably increased to about 32 (33 grid points)).

The grid number changing section 312 may be adapted so that it obtains the segmentation class information, indicative of an image area of the inputted image (characteristics data indicative of the inputted image), from the segmentation processing section (segmentation processing section, characteristics data detecting section) 14, and, based on the segmentation class information, changes the number of divisions $2^n$ of the coordinate axes in the color space stored in the color space storing section 309.

Specifically, the grid number changing section 312 includes a table of correspondence between the segmentation class information, indicative of the type of an image area, and the number of divisions $2^n$. In the table, it is preferable that the number of divisions $2^n$ that corresponds to the segmentation class information indicative of the text area be set to be smaller than the number of divisions $2^n$ that corresponds to the segmentation class information indicative of the halftone area and the photographic area (continuous tone area).

In this way, the grid number changing section 312 acquires segmentation class information from the segmentation processing section 14. From the table, the grid number changing section 312 reads out the number of divisions $2^n$ corresponding to the acquired segmentation class information. Based on the number of divisions $2^n$ so read out, the grid number changing section 312 changes the number of divisions of each coordinate axis in the color space stored in the color space storing section 309. This changes the number of unit cells in the color space, and the width of the unit cells.

In this manner, the number of unit cells in the color space is changed according to the type of an inputted image (a text image, a printed picture image which comprises halftones, a photographic picture which comprises continuous tones (for example, silver halide photography, etc.)). As a result, an interpolation process is realized that is suited for the type of an inputted image. Specifically, the following control is performed. For a photographic image that requires accurate interpolation, the number of divisions $2^n$ and therefore the number of unit cells in the color space is increased to realize accurate interpolation. For a text image that does not require accurate interpolation, the number of divisions $2^n$ and therefore the number of unit cells in the color space is decreased to save memory space.

In the following, detailed description is made as to specific processes performed by the segmentation processing section (characteristics data detecting section, segmentation processing section) 14. A segmentation process is performed, for example, according to the method described in Japanese Laid-Open Patent Publication No. 2002-232708. In this method, calculations are made to yield (i) a maximum density difference, which is the difference between a minimum density value and a maximum density value in an n×m (for example, 15×15) block centered on a current pixel, and (ii) a sum of density complexities, which is the sum of absolute values of density differences between adjacent pixels. The results are compared with predetermined threshold values to separate the image into a background area/photographic area and a text edge area/halftone area. The segmentation is based on the following reasoning (A) through (D).

(A) The density distribution of a background area generally has a small density change, and as such the maximum density difference and the sum of density complexities are small.

(B) The density distribution in a photographic picture area (a photographic area of a photographic printing paper) has a small density change, and as such the maximum density difference and the sum of density complexities are small, though slightly greater than those in the background area.

(C) In the density distribution of the halftone area, the maximum density difference varies greatly depending on halftones. However, since the sum of density complexities is based on densities that vary according to the number of halftones, the sum of density complexities have a greater influence than the maximum density difference. Thus, when the sum of density complexities is greater than the product of the maximum density difference and a text/halftone threshold value (one of the predetermined threshold values), a pixel of interest can be determined as a halftone pixel.

(D) The density distribution of the text area has a large maximum density difference, and there accordingly will be a large sum of density complexities. However, since the density change is smaller than in the halftone area, the sum of density complexities is smaller than in the halftone area. Thus, when the sum of density complexities is smaller than the product of the maximum density difference and a text/halftone threshold value, a pixel of interest can be determined as a text edge pixel.

Specifically, the segmentation follows the following procedures (E) through (G).

(E) Comparisons are made between the calculated maximum density difference and a threshold for a maximum density difference, and between the calculated sum of density complexities and a threshold for a sum of density complexities. When the maximum density difference is smaller than the threshold for a maximum density difference, and when the sum of density complexities is smaller than the threshold for a sum of density complexities, a current pixel is determined as a background/photographic area. If not, the current pixel is determined as a text/halftone area.

(F) When the current pixel is determined as a background/photographic area, comparison is made between the calculated maximum density difference and a threshold for a background/photographic area. When the maximum density difference is smaller, the identified area is determined as a background area. When the maximum density difference is greater, the identified area is determined as a photographic area.

(G) When the current pixel is determined as a text/halftone area, comparison is made between the calculated sum of density complexities and a value obtained by multiplying the maximum density difference by the threshold for a text/halftone area. When the sum of density complexities is smaller, the identified area is determined as a text edge area. When the sum of density complexities is greater, the identified area is determined as a halftone area.

(Change According to Document Type)

The foregoing described the case where the number of unit cells in a color space is changed according to the segmentation class information obtained from the segmentation processing section 14. However, when the inputted image is one read from a document, the number of unit cells may be changed according to the type of document.

One way to identify a document type is to allow a user to select and enter a document type through the operation panel 5, for example. In this case, the type of document is identified by a CPU according to the user entry. The CPU then generates document type information (document type discrimination signal), indicative of the type of document, and the grid number changing section 312 acquires the document type information so generated.

Figure 13:
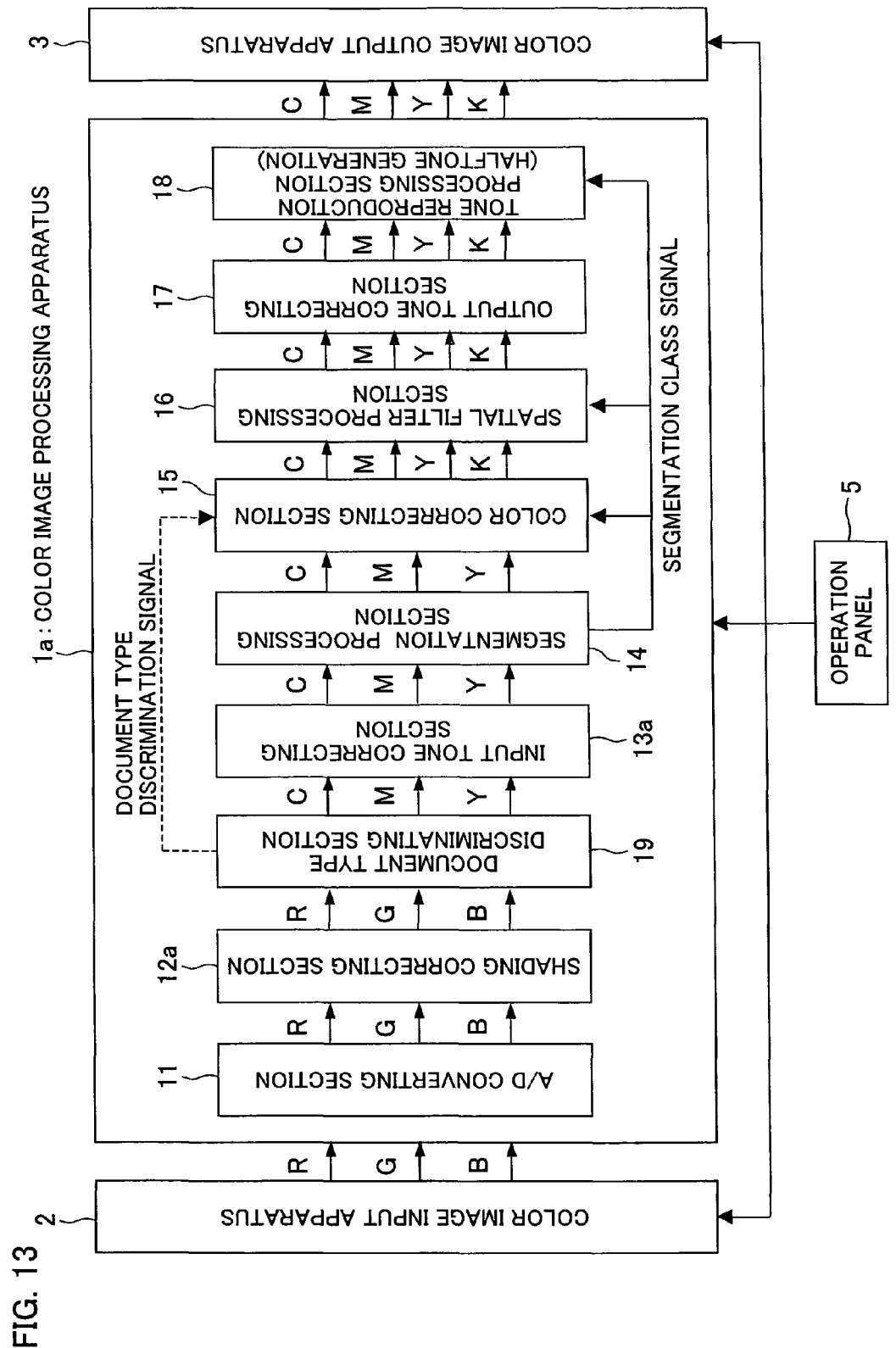
FIG. 13 is a block diagram showing an image forming apparatus provided with the image processing apparatus according to another embodiment of the present invention.

Instead of manual entry by a user, identification of a document type may be made by extracting the feature of the document with a document type discriminating section (characteristics data detecting section), and by identifying the type of document based on the feature so extracted. FIG. 13 shows a structure of an image processing apparatus 1a that is adapted to serve such functions. The structure shown in FIG. 13 differs from its counterpart in FIG. 1 in that it includes a document type discriminating section (document type discriminating section, characteristics data detecting section) 19 between the shading correcting section and the input tone correcting section. The structure shown in FIG. 13 differs from that of FIG. 1 only by the processes of a shading correcting section 12a and an input tone correcting section 13a. The following describes these differences.

The shading correcting section 12a removes various distortions, which occur in the illuminating, focusing, and/or sensing systems of the image input apparatus 2, from the digital RGB signals sent from the A/D converter 11. The shading correcting section 12a also adjusts color balances.

By the document type discriminating section (document type discriminating section, characteristics data detecting section) 19, the RGB signals (reflectance signals of RGB) from which distortions have been removed by the shading correcting section 12 and for which color balances have been adjusted are converted into signals, such as density (pixel value) signals, that can be easily processed by the image processing system adopted by the color image processing apparatus 1a. Together, the document type discriminating section 19 determines whether the input document image is a text document, a print-picture document (halftone dot picture document), a photographic picture, or a text/print-picture document combining these different types of documents, and supplies document type information (document type discrimination signal, characteristics data indicative of an inputted image), indicative of a document type, to the grid number changing section 312.

The input tone correcting section 13a performs image quality adjusting processes, such as removal of background density, or contrast adjustment.

The document type discriminating section 19 can identify a document type according to the procedure described in Japanese Laid-Open Patent Publication No. 2002-218232, for example. This method starts from a pre-scan, whereby the following parameters are determined according to a density histogram: the number of low frequency density domains below a predetermined threshold value; a density domain with a first maximum frequency; and a density domain with a second maximum frequency, excluding density domains adjacent to the density domain with the first maximum frequency. Then, calculations are made to determine a proportion of the first maximum frequency with respect to a total number of pixels, and a proportion of (first maximum frequency−second maximum frequency) with respect to a total number of pixels. The resulting values are then compared with predetermined first, second, and third threshold values to identify the document either as a text, a photograph, or a text/photograph. When the document is a photograph, the inputted image data is converted into binary values, and a mask is set that is made up of a plurality of pixels including a current pixel. Then, a sum of density transitions, from "0" to "1", or "1" to "0" is determined in the main scanning direction and a sub scanning direction (the calculation may be made only in the main scanning direction to save time). When the result is at or above a predetermined threshold value, the image is determined as a printed picture (printed picture has large image-signal fluctuations in a local area). When the result is below the threshold, the image is determined as a photographic picture.

Identification of a document type may be made by performing a pre-scan as above, or by reading image data that has been stored, after the shading correction, in a storage medium such as hard disk.

In FIG. 13, feedback of the document type information as a result of document type identification is made only for the color correcting section 15. However, the document type information may be supplied to the input tone correcting section 13a, the segmentation processing section 14, the spatial filter processing section 16, and the tone reproduction processing section 18 as well.

As described above, the grid number changing section 312 obtains document type information generated by the document type discriminating section 19 or entered by a user, and changes the number of unit cells according to the document type information.

Specifically, an inputted image read out from a text document generally does not have many colors and rarely requires accurate interpolation. This allows the number of unit cells in the color space to be decreased and saves memory space (the number of divisions or unit cells in each coordinate axis in the color space can be decreased to about 8 (9 grid points)).

An inputted image read out from a photographic document requires accurate interpolation. It is therefore preferable to increase the number of unit cells set in the color space (for example, the number of divisions or unit cells in each coordinate axis is preferably increased to about 32 (33 grid points)).

The grid number changing section 312 includes a table of correspondence between the document type information, indicative of the type of document, and the number of divisions $2^n$. In the table, it is preferable that the number of divisions $2^n$ that corresponds to document type information indicative of a text document be set to be smaller than the number of divisions $2^n$ that corresponds to document type information indicative of a photographic document.

Upon acquiring the document type information (characteristics data) from the document type discriminating section 19 or the like, the grid point changing section 312 refers to the table and reads therefrom the number of divisions $2^n$ that corresponds to the acquired document type information. Based on the number of divisions $2^n$ so read out, the grid number changing section 312 changes the number of divisions of each coordinate axis of the color space stored in the color space storing section 309, and thereby changes the number (and accordingly width) of unit cells in the color space.

In this manner, the number of unit cells in the color space is changed according to the type of document. As a result, an interpolation process is realized that is suited for each different type of document. Specifically, the following control is performed. For an inputted image that has been read from a photographic document that requires accurate interpolation, the number of divisions $2^n$ and therefore the number of unit cells in the color space is increased to realize accurate interpolation. For an inputted image that has been read from a photographic document that does not require accurate interpolation, the number of divisions $2^n$ and therefore the number of unit cells in the color space is decreased to save memory space.

(Change According to a Print Processing Mode of Image Output Apparatus)

The number of unit cells set in the color space may be changed according to the print processing mode set in the image output apparatus (printing apparatus) 3. As used herein, the "print processing mode" includes, for example, a processing mode such as a drafting mode or a high quality image mode, and print modes for different media (recording material such as paper used to form image).

For example, when a drafting mode is selected as a processing mode of the image output apparatus 3, priority is given to image processing speed over image quality. It is therefore preferable to save memory space by decreasing the number of unit cells set in the color space. When a high quality image mode is selected as a processing mode of the image output apparatus 3, it is preferable to realize accurate interpolation by increasing the number of unit cells set in the color space.

Further, when the processing mode of the image output apparatus 3 is a plain paper mode that uses a plain paper for printing, priority is given to print speed over image quality. It is therefore preferable to save memory space by decreasing the number of unit cells set in the color space. When a unique paper mode is selected that uses a unique paper (for example, glossy paper) that has been treated to produce a photographic print, priority is given to image quality over processing speed. It is therefore preferable to realize accurate interpolation by increasing the number of unit cells set in the color space.

Specifically, the grid number changing section 312 includes a table of correspondence between mode information, indicative of a print processing mode of the image output apparatus 3, and the number of divisions $2^n$. The grid number changing section 312 acquires the mode information indicative of the print processing mode currently set in the image output apparatus 3, and reads out therefrom the number of divisions $2^n$ that corresponds to the acquired mode information. Based on the number of divisions $2^n$ so read out, the grid number changing section 312 changes the number of divisions of each coordinate axis of the color space stored in the color space storing section 309, and thereby changes the number (and accordingly width) of unit cells in the color space.

The print mode set in the image output apparatus 3 may be selected by a user through the operation panel equipped in the image output apparatus 3, or from the pull-down menu according to print settings (printer driver settings) displayed in a computer screen, using a keyboard or a mouse. That is, the mode information obtained by the grid number changing section 312 is the information that is generated by a CPU or the like according to the print mode that has been selected through the operation panel of the image output apparatus 3 or by a computer.

(Change According to User Preference)

The number of unit cells set in the color space may be changed according to a user command entered in the image processing apparatus 1. That is, a user is able to change the number of unit cells in the color space as he/she likes.

When a user wishes to give priority to other processes such as an image quality improving process by way of color correction, or perform the image process more quickly, it is preferable to save memory space by decreasing the number of unit cells set in the color space. When priority is given to color correction or when image processing time is not of concern, accurate interpolation can be realized by increasing the number of unit cells set in the color space.

Specifically, the grid number changing section 312 includes a table of correspondence between mode information, indicative of an image processing mode (high-speed mode, high image quality mode, etc.), and the number of divisions $2^n$.

When the mode information (command) indicative of an image processing mode is entered by a user through the operation panel 5, the grid point changing section 312 refers to the table and reads therefrom the number of divisions $2^n$ that corresponds to the entered mode information. Based on the number of divisions $2^n$ so read out, the grid number changing section 312 changes the number of divisions of each coordinate axis of the color space stored in the color space storing section 309, and thereby changes the number (and accordingly width) of unit cells in the color space.

In this manner, the number of unit cells in the color space is changed according to the image processing mode selected by a user. As a result, an interpolation process is realized that is suited for the selected image processing mode. Specifically, when a high-speed processing mode is selected, the number of unit cells set in the color space is decreased to realize a fast image process. When a high quality mode is selected, the number of unit cells set in the color space is increased to realize accurate interpolation.

Third Embodiment

Color printers (color image forming apparatuses) can be broadly classified into two categories. One is of a high-end type in which printers are capable of processing data in PDL (Page Description Language) and the process of generating print data is performed on the printers. The other is a low-end type in which the printers only perform the print process while the host generates print data.

Figure 16:
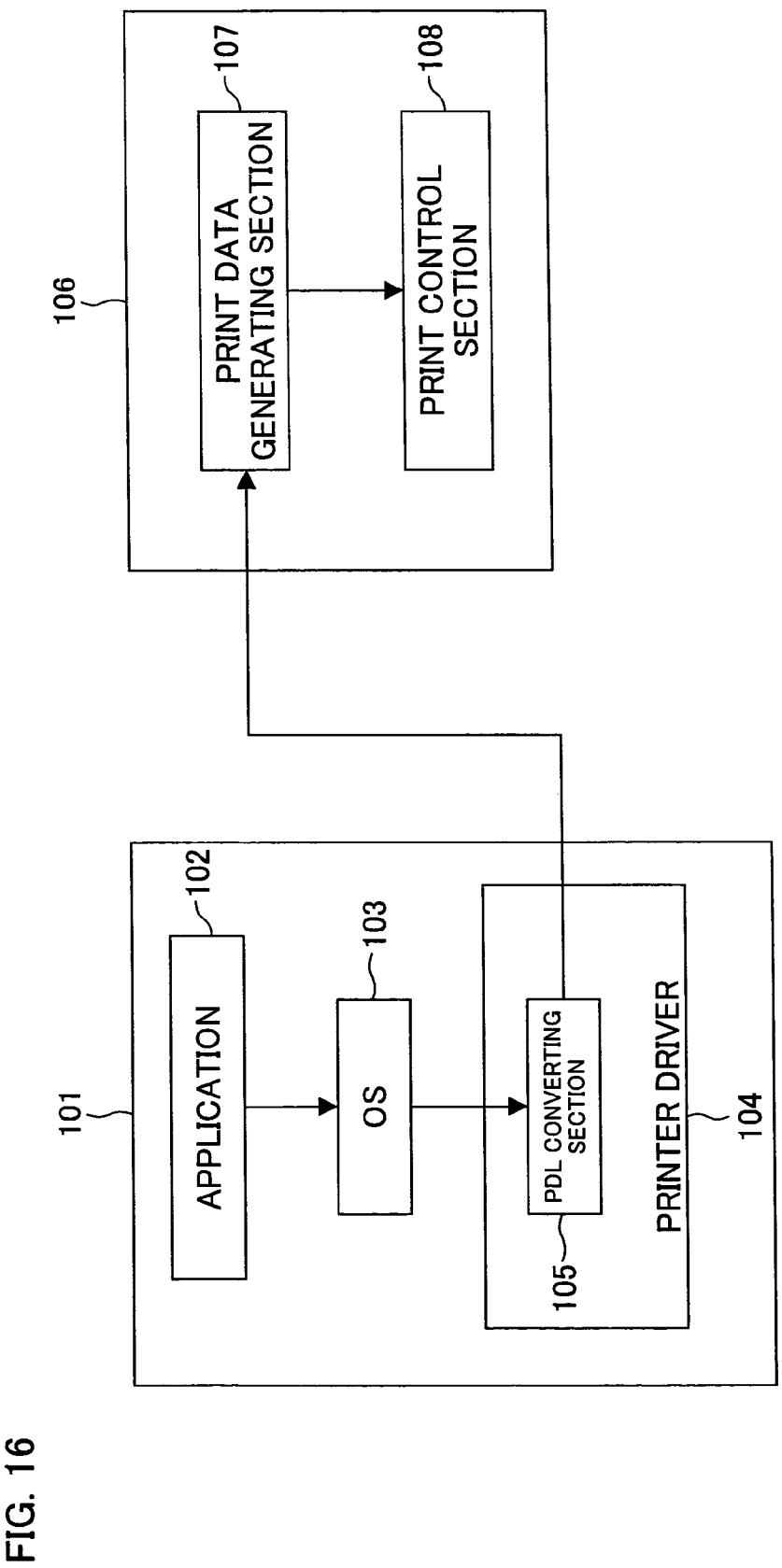
FIG. 16 is a block diagram showing a schematic structure of a high-end color printer constituting an image processing apparatus according to another embodiment of the present invention.

FIG. 16 shows a simplified structure of a high-end color printer that has been designed to process PDL data. In a host 101, an application 102 sends a print command to an OS 103. In response, the OS 103 sends a depict command to a printer driver 104. Based on the depict command from the OS 103, a PDL converting section 105 in a printer driver 104 converts the data, generated by the application 102 in the host 101, into PDL. Then, the host 101 sends the PDL data to a printer 106. In response, the printer 106 in a print data generating section 107 converts the received PDL data into print data, and a print control section 108 performs a print process based on the print data.

Figure 17:
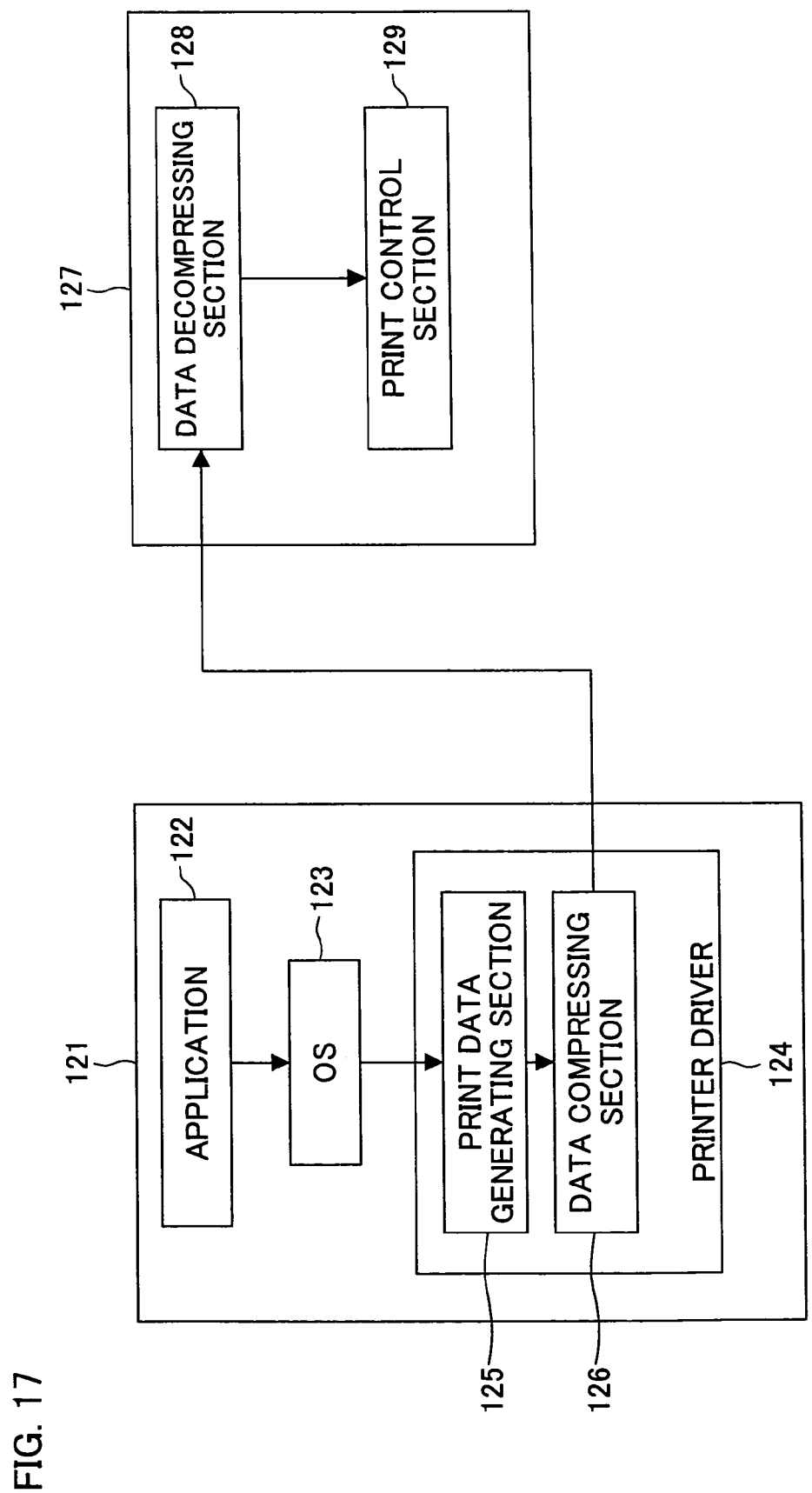
FIG. 17 is a block diagram showing a schematic structure of a low-end printer.

FIG. 17 shows an example of a low-end printer. As in the high-end printer, an application 122 in a host 121 sends a print command to an OS 123, which then sends a depict command to a printer driver 124. The printer driver 124 is provided with a print data generating section 125, which, under the instructions of the OS 123, generates print data. To reduce the data volume, a data compressing section 126 compresses the print data. The host 121 then sends the compressed print data to a printer 127. The printer 127 decompresses the print data in a data decompressing section 128 and sends the data to a print control section 129 which perform a print process based of the print data.

PDL is the language used to describe print images in a printer. Various PDLs have been proposed by many different companies. Main stream examples are PCL (Printer Control Language) of HP (Hewlett-Packard), and PS (Post Script®) of Adobe. In Japan, ESC/Page® and Lips have been proposed by EPSON and Canon, respectively. The following describes how PDL is used to depict graphics and texts in an image, taking the PS of Adobe as an example. A PS file is described in text form. Graphics are depicted with a set of preset commands, which are used either individually or in combination. The command may be drawing a line or drawing a curve, for example. Elaborate graphics can be depicted by combining these commands. Settings include depiction position, depiction method, color, line width, and marking out, which are designated by preset commands. Likewise, texts are depicted according to a predetermined format, by designating a font, depiction position, depiction color, and text strings. In a PS-compatible printer, a print data forming section converts the supplied PS file into data characteristic of the printer, and the data is sent to a printer engine (print control section).

Figure 18:
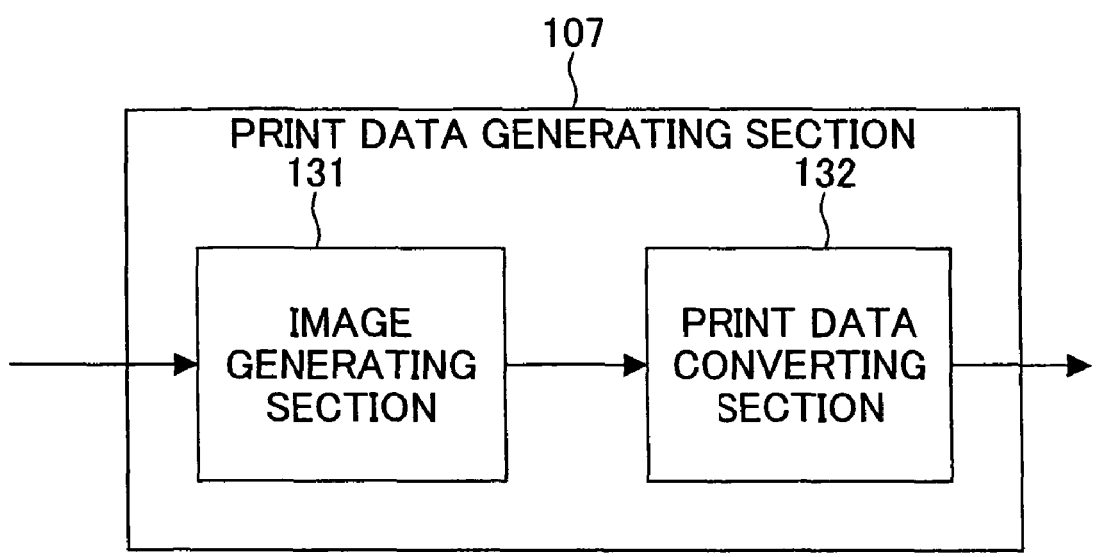
FIG. 18 is a block diagram showing a structure of a print data generating section included in the high-end printer.

The generation of print data using PDL data is performed in the following manner. FIG. 18 is a block diagram showing a structure of the print data generating section 107 that generates the print data using the PDL data. The PS, one of the PDL, can designate colors for each graphic or text. This script can also designate a color space as defined by RGB or CIE (Commission International de l'Eclairage), or a color space specifically defined for the script. An image generating section 131 in the print data generating section 107 generates image data based on the data so designated. The image data is then sent to an image data converting section 132, and is converted in the print control section 108 to print data to be used for printing.

The image data is generated as follows, for example.

Figure 19:
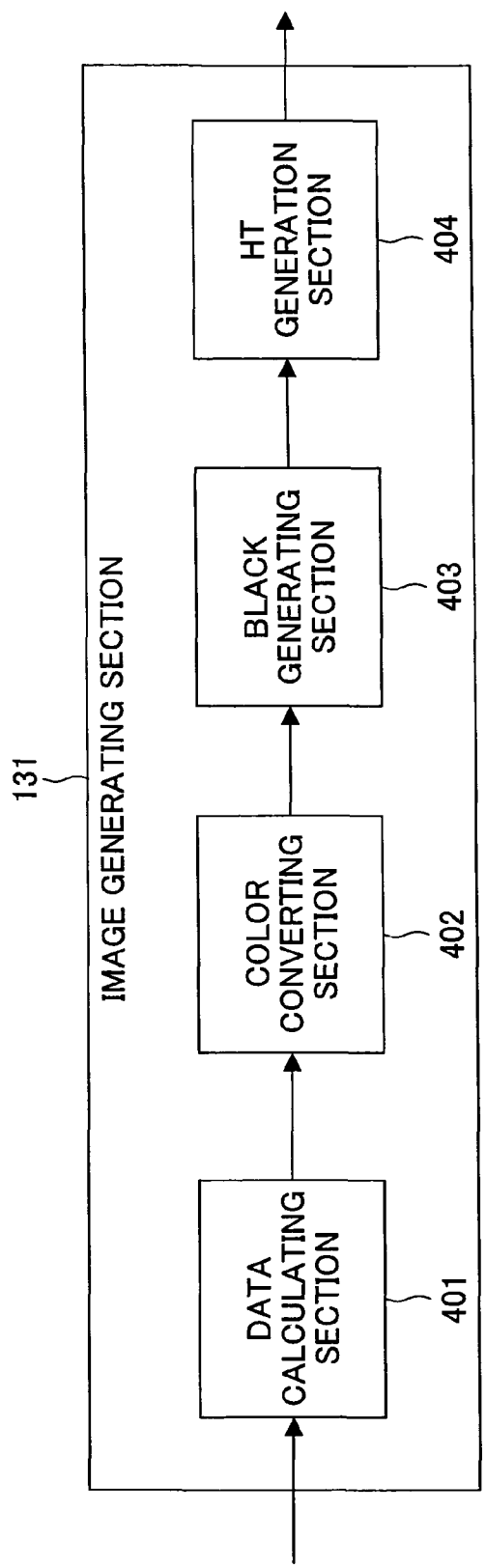
FIG. 19 is a block diagram showing a structure of an image generating section included in the print data generating section.

FIG. 19 is a block diagram showing a structure of the image generating section 131. Upon receiving the depict command, the image generating section 131 calculates values of the pixel positions (pixel positions in the color space) in a data calculating section 401, based on information of the input data. The data calculating section 401 functions in the same ways as the coordinates calculating section 302 described with reference to FIG. 1 in the First Embodiment. The calculated values of pixel positions are in accordance with the color space designated by the data. Note that, the color space of the data is set when reading an image with an image reading device such as a scanner. Alternatively, the color space may be changed or set with application software. Thereafter, in a color converting section 402, the color space described in the PDL or OS print command is converted into a device color space (printer color space), using color profiles provided in the printer. The image data converted into a device color space is subjected to a process of generating a black component and removing under color in a black generating section 403, and a halftone process in a HT (halftone) section 404, before it is sent to the print data converting section 132 and converted into print data.

The color converting section 402 has the same structure as that described with reference to FIG. 12 in the Second Embodiment. As shown in FIG. 12, the color converting section 201 includes a weight calculating section 301, a coordinates calculating section 302, an address calculating section 303, a memory 304, an interpolation operating section 305, a gamut selecting section 306, a LUT writing section 307, a position information changing section 308, a color space storing section 309, and a grid number changing section (grid number changing section) 312a. As in the Second Embodiment, the weight calculating section 301, the coordinates calculating section 302, the address calculating section 303, the memory 304, the interpolation operating section 305, the gamut selecting section 306, the LUT writing section 307, the position information changing section 308, and the color space storing section 309 all have the structures as described in the First Embodiment.

In the present embodiment, the grid number changing section 312a determines the number of divisions $2^n$ (for example, 8, 16, 32, 64, etc.) for the coordinate axes of the color space stored in the color space storing section 309, according to the discrimination information (image type (document type) set by object information or a printer driver) it obtains. The grid number changing section 312a then divides each coordinate axis of the color space (RGB color space stored in the color space storing section 309) with the number of divisions $2^n$ it has determined. Meanwhile, the gamut selecting section 306 refers to the color space storing section 309 and the RGB color space contained therein for which the number of divisions $2^n$ has been decided by the grid number changing section 312a. From the color space, the gamut selecting section 306 selects a gamut corresponding to the inputted image, and, based on the selected gamut, selects a distribution area for the grid points corresponding to the inputted image. The grid number changing section 312a then calculates CMY image data corresponding to the grid points that are contained in the distribution area selected by the gamut selecting section 306 and that were formed by the division. The calculation is made by the color conversion of PDL data.

The calculated CMY image data is written in the LUT 304a of the memory 304. The position information converting section 308 changes the position information of the grid points that are contained in the distribution area selected by the gamut selecting section 306 and that were formed by the division. Then, the position information converting section 308 stores the position information in the memory 304.

As described above, in the Third Embodiment, the grid point data written in the LUT 304a is the data of grid points contained in the RGB color space that has been divided by the number of divisions $2^n$ as decided by the grid number changing section 312a.

Figure 20:
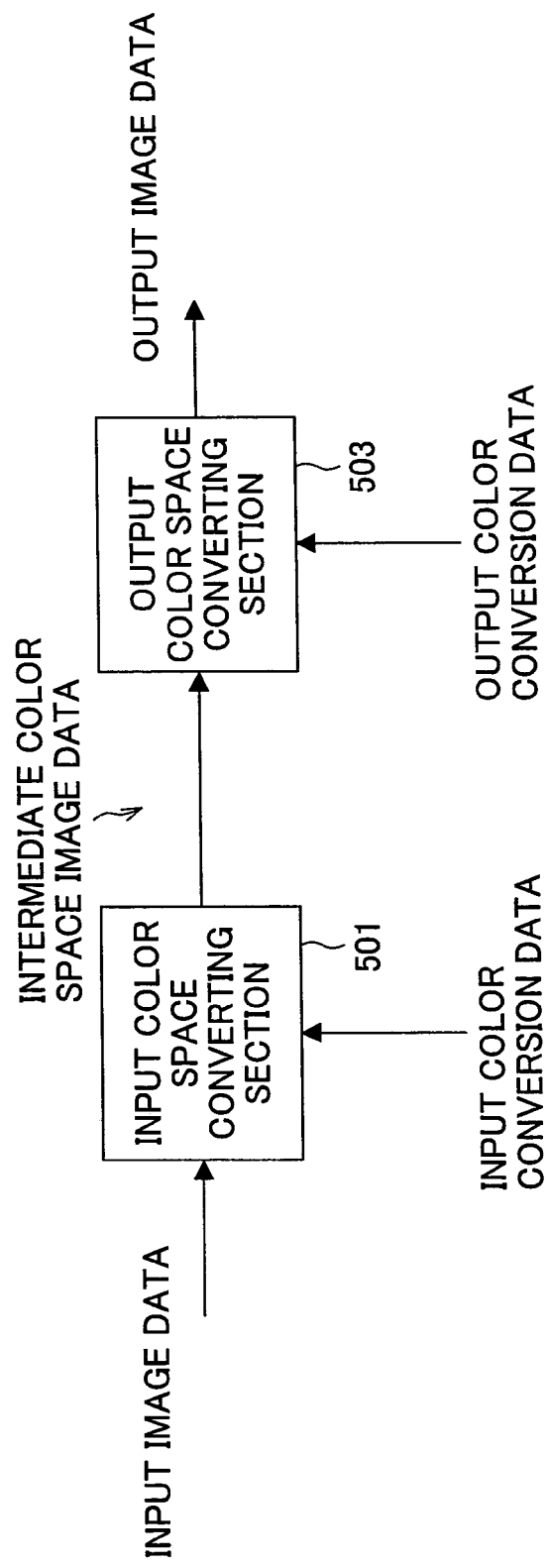
FIG. 20 is a diagram showing how color conversion of PDL data is performed.

In the following, description is made as to the color conversion of PDL data. The color conversion of PDL data is generally performed as shown in FIG. 20. As described above, the number of grid points has been decided based on the discrimination information (image type (document type) set by object information or a printer driver). Using the number of grid points, an input color space converting section 501 converts the color space of inputted image data into an intermediate color space, based on input color conversion data. An output color space converting section 503 then converts the intermediate color space into an output color space, using output color conversion data. Here, the grid number changing section 312a serves as the input color space converting section 501 and the output color space converting section 503.

For example, in the case of PS, CIE XYZ is used for the intermediate color space. As used herein, CIE XYZ refers to a color space with the tristimulus values XYZ that are determined by the color matching functions of the XYZ color system stipulated by the Commission International de l'Eclairage. The input color conversion data is also known as CSA (Color Space Array), and the output color conversion data is also known as CRD (Color Rendering Dictionary).

The color space of inputted image data can be selected from sRGB, AdobeRGB, or scanner RGB, for example. The selection of a color space may be performed by a user with a printer driver, or the color space may be specified beforehand in print data (a color space to be processed in the printer has been decided).

Basically, the output color space of the printer constitutes the characteristic color space of the output device. There are provided several types of output tables that comply with the characteristics of the output device and the depiction characteristics (for example, perception-oriented depiction characteristics that give priority to photographs or realistic images, color-saturation-oriented depiction characteristics that give priority to color saturation as in business graphics, and depiction characteristics that have been adjusted to minimize color difference). The output color space can also be selected by a user with a printer driver when printing.

Figure 21:
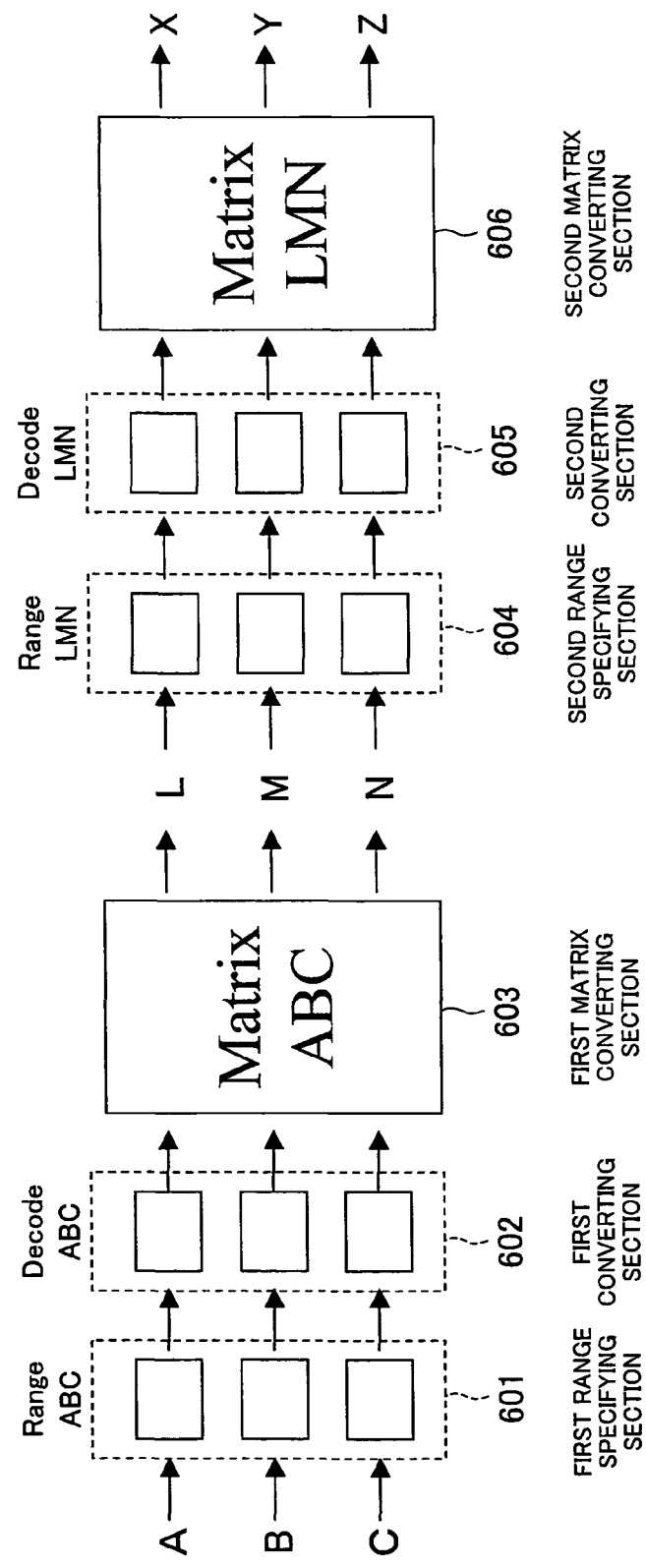
FIG. 21 is a diagram showing how CSA, one example of input color conversion data, is converted.

The following describes CSA for PS, as an example of input color conversion data. CSA is structured such that it can support more than one type of color spaces of inputted image data. As such, slightly different types of data are stored for each different type of color space being supported. A representative example is a path that converts a color space, known as CIE based ABC, to CIE XYZ. This is shown by the scheme illustrated in FIG. 21. First, an effective range of input data is specified in a RangeABC (601) step performed by a first range specifying section. The input data fall within the range of Formula (8) below.

$$A_0 \leq A \leq A_1$$

$$B_0 \leq B \leq B_1$$

$$C_0 \leq C \leq C_1 \tag{8}$$

Then, in a DecodeABC (602) step performed by a first converting section, conversion is made for the values of ABC, using arbitrary functions. The functions may be defined by Formula (9) below, or by a one-dimensional LUT.

$$A' = D_A(A)$$

$$B' = D_B(B)$$

$$C' = D_C(C) \tag{9}$$

Next, matrix conversion is performed in a MatrixABC (603) step performed by a first matrix converting section, according to the following Formula (10). The resulting values LMN take intermediate values yet to be converted to XYZ values.

$$L = D_A(A) \times L_A + D_B(B) \times L_B + D_C(C) \times L_C$$

$$M = D_A(A) \times M_A + D_B(B) \times M_B + D_C(C) \times M_C$$

$$N = D_A(A) \times N_A + D_B(B) \times N_B + D_C(C) \times N_C \tag{10}$$

Then, in a RangeLMN (604) step performed by a second range specifying section, an effective range of the LMN data is specified. The input data are confined within the range as defined by Formula (11) below, before it is sent to the next stage.

$$L_0 \leq L \leq L_1$$

$$M_0 \leq M \leq M_1$$

$$N_0 \leq N \leq N_1 \tag{11}$$

In a DecodeLMN (605) step performed by a second converting section, the data are converted using arbitrary functions as in the DecodeABC (602) step. The functions may be defined by Formula (12) below, or may be defined by a one-dimensional LUT.

$$L' = D_L(L)$$

$$M' = D_M(M)$$

$$N' = D_N(N) \tag{12}$$

Finally, matrix conversion is performed in a MatrixLMN (606) step performed by a second matrix converting section. This is performed according to the following Formula (13), which yields CIE XYZ.

$$X = D_L(L) \times X_L + D_M(M) \times X_M + D_N(N) \times X_N$$

$$Y = D_L(L) \times Y_L + D_M(M) \times Y_M + D_N(N) \times Y_N$$

$$Z = D_L(L) \times Z_L + D_M(M) \times Z_M + D_N(N) \times Z_N \tag{13}$$

The CSA for PS may be provided beforehand in PS data, or may be created from the ICC (International Color Consortium) profiles.

Figure 22:
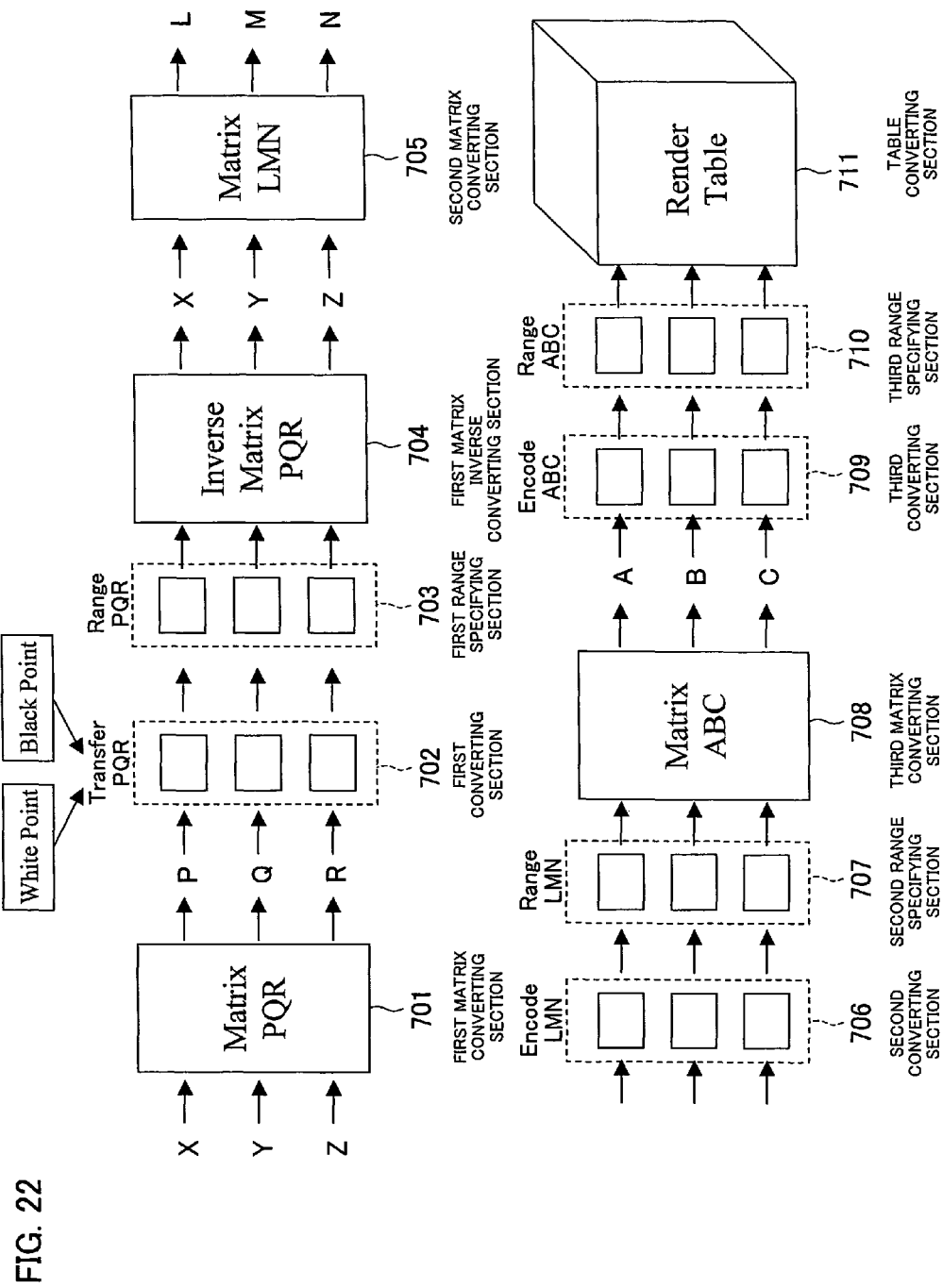
FIG. 22 is a diagram showing how CRD, one example of output color conversion data, is converted.

The following describes CRD for PS, as an example of output color conversion data. In CRD, conversion is commonly carried out according to the scheme shown in FIG. 22. In some printers, some of the steps may be omitted.

First, in a MatrixPQR (701) step performed by a first matrix converting section, matrix conversion is performed for the input values, using Formula (14) below. The resulting values PQR take intermediate values yet to be converted into XYZ. Here, Ps, Qs, Rs represent PQR yet to be converted to an output range.

$$P_s = X_s \times P_X + Y_s \times P_Y + Z_s \times P_Z$$

$$Q_s = X_s \times Q_X + Y_s \times Q_Y + Z_s \times Q_Z$$

$$R_s = X_s \times R_X + Y_s \times R_Y + Z_s \times R_Z \tag{14}$$

Next, in a TransformPQR (702) step performed by a first converting section, PQR is converted into an output range according to Formula (15) below. For the conversion into an output range, the first converting section uses a white point and a black point of the input and output. Formula (15) defines a function using a white point and a black point of the input and output. Here, Pd, Qd, Rd represent PQR yet to be converted to an output range.

$$P_d = T_P(W_s, B_s, W_d, B_d, P_s)$$

$$Q_d = T_P(W_s, B_s, W_d, B_d, Q_s)$$

$$R_d = T_P(W_s, B_s, W_d, B_d, R_s) \quad (15)$$

Next, in a RangePQR (703) step performed by a first range specifying section, an effective range is specified for the converted PQR data. The input data are confined within the range as defined by Formula (16) below, before it is sent to the next stage.

$$P_0 \leq P \leq P_1$$

$$Q_0 \leq Q \leq Q_1$$

$$R_0 \leq R \leq R_1 \quad (16)$$

Next, in an InverseMatrixPQR (704) step performed by a first matrix inverting section, the PQR is converted by the inverse conversion matrix represented in Formula (17) below, so as to reproduce CIE XYZ.

$$X_d = P_d \times X_P + Q_d \times X_Q + R_d \times X_R \quad (17)$$
$$Y_s = P_d \times Y_P + Q_d \times Y_Q + R_d \times Y_R$$
$$Z_s = P_d \times Z_P + Q_d \times Z_Q + R_d \times Z_R$$

$$\begin{bmatrix} X_P & Y_P & Z_P \\ X_Q & Y_Q & Z_Q \\ X_R & Y_R & Z_R \end{bmatrix} = \begin{bmatrix} P_X & Q_X & R_X \\ P_Y & Q_Y & R_Y \\ P_Z & Q_Z & R_Z \end{bmatrix}^{-1}$$

Next, in a MatrixLMN (705) step and an EncodeLMN (706) step performed by a second matrix converting section and a second converting section, respectively, XYZ is converted into LMN by the conversion including the matrix conversion, according to Formula (18) below. The resulting LMN are intermediate values.

$$L = E_L(X \times L_X + Y \times L_Y + X \times L_Z)$$

$$M = E_M(X \times M_X + Y \times M_Y + X \times M_Z)$$

$$N = E_N(X \times N_X + Y \times N_Y + X \times N_Z) \quad (18)$$

Next, an effective range of LMN is specified in a RangeLMN (707) step performed by a second range. The input data are confined within the range as defined by Formula (19) below, before it is sent to the next stage.

$$L_0 \leq L \leq L_1$$

$$M_0 \leq M \leq M_1$$

$$N_0 \leq N \leq N_1 \quad (19)$$

Next, in a MatrixABC (708) step and a EncodeABC (709) step performed by a third matrix converting section and a third converting section, respectively, a conversion including an arbitrary matrix conversion is performed according to Formula (20) below, as in MatrixLMN (705) and EncodeLMN (706).

$$A = E_A(L \times A_L + M \times A_M + N \times A_N)$$

$$B = E_B(L \times B_L + M \times B_M + N \times B_N)$$

$$C = E_C(L \times C_L + M \times C_M + N \times C_N) \quad (20)$$

An effective range of ABC is specified in a RangeABC (710) step performed by a third range specifying section. ABC is confined within the range as defined by Formula (21) below.

$$A_O \leq A \leq A_1$$

$$B_0 \leq B \leq B_1$$

$$C_0 \leq C \leq C_1 \quad (21)$$

Finally, in a RenderTable (711) step performed by a table converting section, ABC is converted to final device values, using a specified three-dimensional LUT. The table conversion is performed according to a table interpolation method adopted by the printer. A representative example is a tetrahedral interpolation.

As described above, color conversion for PDL is performed with input color conversion data and the output color conversion data. However, owning to the fact that the procedure involves many conversion steps, color conversion is sometimes performed by creating a new three-dimensional LUT, using the input color conversion data and the output color conversion data.

The foregoing described the case where PS was used as PDL. However, since different PDLs require different input color conversion data and output color conversion data, structures of the input color converting section and the output color converting section, as shown in FIG. 20, vary for different PDLs. As a countermeasure, different kinds of processing blocks may be provided for different PDLs, and a suitable processing block may be selected according to the type of PDL used.

The following describes how the number of cells is changed.

(Change According to Objects)

The number of unit cells may be changed according to information (element information, object information) used to discriminate elements of image data. PDL data is made up of 3 kinds of objects: texts, graphics, and images (printed picture images and photographic picture images). These objects are discriminated from one another based on object information contained in PDL data, so as to allow for color conversion using different profiles for each different object. As an example of using an output profile, the color converting section 402 uses a color-saturation-oriented output table as the LUT 304a when the objects are texts and graphics, and uses a tone-oriented output table as the LUT 304a when the objects are images.

In the grid number changing section 312a of the present embodiment, the object information contained in the PDL data is obtained as the discrimination information, and the number of grid points is changed for each object. For example, when the objects are texts, the number of grid points can be reduced to, for example, 9 for each axis, because texts generally contain a relatively small number of colors and rarely require accurate interpolation. Images and graphics require accurate interpolation. As such, when the objects are images or graphics, the number of grid points can be increased, for example, to 33 for each axis, in order to perform accurate interpolation.

In this manner, an optimum interpolation process can be performed according to object information.

(Change According to Document Type)

When the inputted image is an image read from a document, the number of unit cells may be changed according to the type of document. In many printers, a user is allowed to freely set and output a document type in a setting display of the printer driver. Selecting a document type decides color information that is optimal to text, graphic, or other images, according to the type of document.

With a document type discrimination signal of the inputted image received by the grid number changing section 312a from the printer driver, the color converting section 402 changes the number of grid points for each type of document identified from the inputted image. The type of document is identified by a CPU based on user settings (user entry), and the CPU generates a document type information (document type discrimination signal) indicative of the document type. The document type discrimination signal is then obtained as discrimination information by the grid number changing section 312a. As in the Second Embodiment, a document type discriminating section for identifying a document type may be provided.

For example, when the inputted image is a text image, the number of grid points can be reduced because the text image generally contains a relatively small number of colors and rarely requires accurate interpolation. A photographic document contains a large number of colors and requires accurate interpolation. As such, when the inputted image is a photographic image, accurate interpolation is performed by increasing the number of grid points to, for example, 33.

(Change According to Document Type and Objects)

The grid number changing section 312a may decide an optimum number of divisions based on a combination of document type information and object information. For example, when the document is a text document, the input document is almost always made up of solely texts. Thus, when the inputted image is a text document, an image process is performed that is suited for both document information and object information. This is carried out, for example, by decreasing the number of grid points when the color distribution range of text objects is small enough, or by retaining the number of grid points when the color distribution range of text objects is large enough.

It should be noted here that the functions of the respective components included in the image processing apparatus as described in the foregoing embodiments can also be realized by causing an arithmetic circuit such as a processor to execute a program code (executable program, intermediate code program, source program) stored in a storing section such as ROM or RAM and thereby controlling various peripheral circuits. That is, the respective functions and processes of the image processing apparatus according to embodiments of the present invention can be realized by simply causing a computer provided with the arithmetic circuit and peripheral circuits to read such a program code from a storage medium and execute the program code. Further, by storing the program code in a removable storage medium, these functions and processes can be realized on any computer.

For example, such storage media may be tapes such as magnetic tapes and cassette tapes; disks such as magnetic disks like floppy Disk® and hard disk, and optical disks such as CD-ROM, MO, MD, DVD, and CD-R; cards such as IC cards (including memory cards) and optical cards; or semiconductor memories such as mask ROM, EPROM, EEROM, and flash ROM.

Further, a printer driver with the program code may be installed in a computer or a printer. Further, a scanner driver with the program code may be installed in a scanner.

Further, the image processing apparatus of an embodiment of the present invention may be arranged so as to be connectable to a communications network, and the program code may be supplied to the image processing apparatus through the communications network. Examples of the communication network include, but are not particularly limited to, the Internet, intranet, extranet, LAN, ISDN, VAN, CATV communications network, virtual private network, telephone network, mobile communications network, and satellite communications network. Further, a transmission medium that constitutes the communications network is not particularly limited. The transmission medium may be, for example, wired lines such as IEEE 1394, USB, power-line carrier, cable TV lines, telephone lines, or ADSL lines; or wireless connections such as IrDA and a remote control using infrared light, Bluetooth®, 802.11, HDR, mobile phone network, satellite connections, and terrestrial digital network. Note that the present invention can also be realized in the form of a computer data signal embedded in a carrier wave, as embodied by electronic transmission of the program code.

Further, an image forming apparatus of an embodiment of the present invention may be realized by an image forming system including: an image reading device such as a flat bed scanner, a film scanner, and a digital camera; a computer that performs image processes by loading the program code; an image display device such as displays (LCD, CRT) displaying results of processes performed by computers; and a printer that outputs images on paper according to image data processed by a computer. The image forming apparatus may further include a network card or a modem, provided as a communicating section, for making connection to a server, etc., via a network.

As described above, an image processing apparatus according to the present invention includes: a memory in which image data of a second color system, corresponding to grid points set in a color space of a first color system is stored; a reading section for reading from the memory second color system image data of grid points corresponding to inputted image data of the first color system, by referring to position information concerning positions of the grid points in the color space of the first color system; an interpolating section for performing an interpolation operation with the second color system image data read by the reading section, so as to generate interpolated image data of the second color system, corresponding to the inputted image data of the first color system; an area selecting section for selecting, based on the inputted image data of the first color system and from the color space of the first color system, a distribution area of grid points necessary for the interpolation process; a data changing section for changing the image data of the second color system stored in the memory to second color system image data that correspond to the grid points contained in the distribution area; and a position information changing section for changing a content of the position information to information concerning positions of the grid points contained in the distribution area.

In one aspect of the present invention, the invention is an image processing apparatus including: a memory in which image data of a second color system, corresponding to grid points set in a color space of a first color system is stored; a reading section for reading from the memory second color system image data of grid points corresponding to inputted image data of the first color system, by referring to position information concerning positions of the grid points in the color space of the first color system; and an interpolating section for performing an interpolation operation with the second color system image data read by the reading section, so as to generate interpolated image data of the second color system, corresponding to the inputted image data of the first color system, and the image processing apparatus further includes: an area selecting section for selecting, based on the inputted image data of the first color system and from the color space of the first color system, a distribution area of grid points necessary for the interpolation process; a data changing section for changing the image data of the second color system stored in the memory to second color system image data that correspond to the grid points contained in the distribution area; and a position information changing section for changing a content of the position information to information concerning positions of the grid points contained in the distribution area.

In one aspect of the present invention, the invention provides an image processing apparatus for generating image data of a second color system by a color conversion process that interpolates inputted image data of a first color system, the image processing apparatus including: a storing section storing (i) image data of the second color system, corresponding to grid points set in a color space of the first color system, and (ii) position information concerning positions of the grid points set in the color space of the first color system; an area selecting section for selecting, based on the inputted image data of the first color system and from the color space of the first color system, a distribution area of grid points necessary for the interpolation process; a data changing section for changing the image data of the second color system stored in the storing section to second color system image data that correspond to the grid points contained in the distribution area; a position information changing section for changing a content of the position information to information concerning positions of the grid points contained in the distribution area; and an interpolating section for performing the interpolation operation based on second color system image data of grid points corresponding to the inputted image data of the first color system, by referring to the position information changed by the position information changing section.

In the image processing apparatus according to the present invention, it is preferable that the distribution area of the grid points necessary for the interpolation process be selected by the area selecting section based on a gamut of the inputted image data of the first color system, the grid points containing (i) grid points corresponding to the inputted image data of the first color system, and (ii) grid points in the vicinity of the grid points corresponding to the inputted image data of the first color system.

Grid points that correspond to an inputted image reside in a gamut of the inputted image and in areas around the gamut. Other grid points are not necessary for the interpolation process. Thus, by selecting a distribution area of grid points corresponding to the inputted image based on the gamut of the inputted image as above, data of grid points that are not necessary for the interpolation process can be excluded from the memory.

In one aspect of the present invention, the area selecting section preferably selects a distribution area of grid points corresponding to the inputted image, based on a gamut of the inputted image.

It is preferable that the image processing apparatus according to the present invention further includes: a characteristics data detecting section for generating characteristics data indicative of the inputted image, based on the inputted image data of the first color system; and a grid number changing section for changing the number of unit cells set in the color space of the first color system which the area selecting section refers to.

Accuracy of interpolation process improves as the number of unit cells (grid points) in a color space is increased, whereas a color space with small numbers of unit cells (grid points) enables the memory to store fewer grid points and save memory space.

In this connection, according to the foregoing arrangement, the number of unit cells in a color space of the first color system which the area selecting section refers to is decreased according to characteristics of the inputted image. Specifically, the following control is performed. For a high-resolution image that requires accurate interpolation, the number of unit cells in the color space is increased to realize accurate interpolation. For a low-resolution image that does not require accurate interpolation, the number of unit cells in the color space is decreased to save memory space.

The image processing apparatus according to the present invention may be adapted so that the grid number changing section changes the number of unit cells by changing the number of divisions for each coordinate axis of the color space of the first color system.

Further, in the image processing apparatus according to the present invention, it is preferable that the characteristics data detecting section serve as a segmentation processing section for performing a segmentation process on the inputted image data of the first color system and send, as the characteristics data, segmentation class information, indicative of a result of the segmentation process, to the grid number changing section.

According to the foregoing arrangement, the number of unit cells in a color space of the first color system can be changed according to the type of inputted image (for example, text image, photographic image), and an interpolation process can be realized that is suited for each type of inputted image. For example, the following control can be performed to prevent image deterioration. More specifically, for text images that do not require accurate interpolations to prevent image deterioration, the number of unit cells in a color space of the first color system is decreased to save memory space. For photographic images that require accurate interpolations to prevent image deterioration, the number of unit cells in a color space of the first color system is increased to perform accurate interpolations and prevent image deterioration.

The image processing apparatus according to the present invention may be adapted so that the inputted image data of the first color system is data read from a document, and that the characteristics data detecting section determines a type of document based on the inputted image data of the first color system and sends, as the characteristics data, document type information, indicative of a type of the document, to the grid number changing section.

Further, the image processing apparatus according to the present invention may be adapted so that the inputted image data of the first color system is data read from a document, and that the image processing apparatus further comprises a grid number changing section for obtaining document type information entered by a user and indicative of a document type, and, based on the document type information, changing the number of unit cells contained in the color space of the first color system which the area selecting section refers to.

According to the foregoing arrangement, the number of unit cells in a color space of the first color system can be changed according to the type of inputted image (for example, text image, photographic image), and an interpolation process can be realized that is suited for each type of inputted image. For example, the following control can be performed to prevent image deterioration. More specifically, for text images that do not require accurate interpolations to prevent image deterioration, the number of unit cells in a color space of the first color system is decreased to save memory space. For photographic images that require accurate interpolations to prevent image deterioration, the number of unit cells in a color space of the first color system is increased to perform accurate interpolations and prevent image deterioration.

The image processing apparatus according to the present invention may be adapted to further include a grid number changing section for obtaining quality data indicative of a quality of an inputted image or a quality of an output image outputted by the image processing apparatus, and, based on the quality data, changing the number of unit cells contained in the color space of the first color system which the area selecting section refers to.

Accuracy of interpolation process can be improved as the number of unit cells in a color space is increased, whereas a color space with a small number of grid points enables the memory to store fewer grid points and save memory space. In this connection, according to the foregoing arrangement, the number of unit cells in a color space of the first color system is changed according to quality of an inputted image. As a result, an interpolation process is realized that is suited for the quality of the inputted image. Specifically, the following control can be performed. For high-quality images that require accurate interpolations, the number of unit cells in a color space of the first color system is increased to realize accurate interpolation. For low-quality images that do not require accurate interpolations, the number of unit cells in a color space of the first color system is decreased to save memory space.

The quality data may indicate a resolution of the inputted image or a resolution of the output image.

According to the foregoing arrangement, the number of unit cells in a color space of the first color system can be changed according to a resolution of an inputted image or output image. As a result, an interpolation process is realized that is suited for image resolutions. For example, the following control can be performed. For low-resolution images that do not require accurate interpolations to prevent image deterioration, the number of unit cells in a color space of the first color system is decreased to save memory space. For high-resolution images that require accurate interpolations to prevent image deterioration, the number of unit cells in a color space of the first color system is increased to perform accurate interpolations.

The quality data may indicate a size of an output image.

According to the foregoing arrangement, the number of unit cells in a color space of the first color system can be changed according to a size of an output image. As a result, an interpolation process is realized that is suited for each size of an output image. For example, the following control can be performed. For small-size images that do not require accurate interpolations to prevent image deterioration, the number of unit cells in a color space of the first color system is decreased to save memory space. For large-size images that require accurate interpolations to prevent image deterioration, the number of unit cells in a color space of the first color system is increased to perform accurate interpolations.

The image processing apparatus according to the present invention may be adapted to further include a grid number changing section for obtaining, from a printing apparatus that prints out an output image of the image processing apparatus, mode information indicative of a print mode set in the printing apparatus, and, based on the mode information, changing the number of unit cells set in the color space of the first color system which the area selecting section refers to.

According to the foregoing arrangement, the number of unit cells in a color space of the first color system can be changed according to a content of a print processing mode. As a result, an interpolation process is realized that is suited for a print processing mode. For example, when the print mode of an image output apparatus is a plain paper mode that uses a plain paper for printing, priority is given to print speed over image quality. In this case, memory space is saved by decreasing the number of unit cells set in the color space. When a unique paper mode is selected that uses a unique paper, priority is given to image quality over processing speed. In this case, the number of unit cells set in the color space is increased to realize accurate interpolation and prevent image deterioration.

It is preferable that the image processing apparatus according to the present invention further includes a grid number changing section for changing, according to a command entered by a user, the number of unit cells set in the color space of the first color system which the area selecting section refers to.

According to the foregoing arrangement, the number of unit cells in a color space of the first color system can be changed according to user preference. Specifically, the following control can be performed. When a user wishes to give priority to processing speed, the number of unit cells in a color space of the first color system is decreased to save memory space. When a user wishes to give priority to image quality, the number of unit cells in a color space of the first color system is increased to realize accurate interpolation.

It is preferable that the image processing apparatus according to the present invention further include a grid number changing section for obtaining element information indicative of elements of the inputted image data of the first color system, and, based on the element information, changing the number of unit cells contained in the color space of the first color system which the area selecting section refers to.

According to the foregoing arrangement, the number of unit cells in a color space of the first color system can be changed according to element information that identifies elements of the first color system image data. The elements of image data define text, graphic, and photographic images. As such, the element information indicates a type of element, whether the element is a text, graphic, or photographic image. The element information may be scribed in page description language.

In this manner, the number of unit cells is changed according to element information. For images that require accurate interpolation results, the number of unit cells is increased according to the type of element contained in the image data. For images where accuracy of interpolation results is not of great importance, the number of grid points is not increased. By thus changing the accuracy of interpolation according to the type of element contained in the image data, an optimum color conversion process can be attained.

Further, the image processing apparatus according to the present invention may adapted so that the inputted image data of the first color system is data read from a document, and that the grid number changing section obtains document type information indicative of a document type of the inputted image data of the first color system, and, based on the element information and the document type information, changes the number of unit cells.

According to the foregoing arrangement, the number of unit cells in a color space of the first color system can be changed according to the element information and document type information indicative of a type of the inputted image data of the first color system. The document type information indicates a type of document corresponding to an inputted image (for example, text document, photographic document). By changing the number of grid points according to the element information and the document type information, the color converting process can be optimized even more effectively.

The image processing apparatus according to the present invention may be adapted so that the area selecting section selects the distribution area from a color space storing section storing (i) a color space of the first color system which is divided in a grid pattern, and (ii) image data of the second color system, corresponding to grid points contained in a plurality of planes perpendicular to an arbitrary axis of the color space of the first color system, and that the data changing section reads the image data of the second color system, corresponding to the grid points contained in the distribution area, from the color space storing section, so as to change the image data.

The present invention provides a method for controlling an image processing apparatus that includes: a memory in which image data of a second color system, corresponding to grid points set in a color space of a first color system is stored; a reading section for reading from the memory second color system image data corresponding to inputted image data of the first color system, by referring to position information concerning positions of the grid points in the color space of the first color system; and an interpolating section for performing an interpolation operation with the second color system image data read by the reading section, so as to generate interpolated image data of the second color system, corresponding to the inputted image data of the first color system, the method including the steps of: selecting, based on the inputted image data of the first color system and from the color space of the first color system, a distribution area of grid points that are necessary for the interpolation process; changing the image data of the second color system stored in the memory to second color system image data corresponding to the grid points contained in the distribution area; and changing a content of the position information to information concerning positions of the grid points contained in the distribution area. Effects similar to the foregoing effects of the image processing apparatus according to the present invention can be obtained by the method.

According to one aspect of the present invention, there is provided a method for controlling an image processing apparatus of the present invention. Specifically, the invention provides a method for controlling an image processing apparatus that includes: a memory in which image data of a second color system, corresponding to grid points set in a color space of a first color system is stored; a reading section for reading from the memory second color system image data corresponding to inputted image data of the first color system, by referring to position information concerning positions of the grid points in the color space of the first color system; and an interpolating section for performing an interpolation operation based on the second color system image data read by the reading section, so as to generate image data of the second color system, corresponding to the inputted image data of the first color system, the method including the steps of: selecting, based on the inputted image data of the first color system and from the color space of the first color system, a distribution area of grid points corresponding to the inputted image; changing the image data of the second color system stored in the memory to second color system image data corresponding to the grid points contained in the distribution area; and changing a content of the position information to information concerning positions of the grid points contained in the distribution area. Effects similar to the foregoing effects of the image processing apparatus according to the present invention can be obtained by the method.

The image processing apparatus may be provided in an image forming apparatus. In this way, effects similar to the foregoing effects can also be obtained.

The image processing apparatus may be realized by a computer. In this case, the present invention also includes an image processing program for causing a computer to operate as the respective sections of the image processing apparatus, and a computer-readable storage medium storing such an image processing program.

The present invention is not limited to the description of the embodiments above, but may be altered by a skilled person within the scope of the claims. An embodiment based on a proper combination of technical means disclosed in different embodiments is encompassed in the technical scope of the present invention.

The present invention is applicable to various types of apparatuses that have image processing functions, for example, such as color copying machines, color printers, monochrome copying machines, monochrome printers, MFP (Multi Function Printer), scanners, and personal computers.

What is claimed is:

1. An image processing apparatus comprising:
    an interpolating section for generating interpolated image data of a second color system, corresponding to inputted image data of a first color system, the inputted image data being data of an inputted image;
    a color space storing section for storing (i) a color space of the first color system, and (ii) image data of the second color system, corresponding to grid points set in the color space of the first color system;
    a rewritable memory;
    an area selecting section for selecting, from the color space of the first color system stored in the color space storing section, a distribution area which contains distributed grid points required for interpolating data in a gamut of the inputted image and which includes (i) the gamut of the inputted image, and (ii) an area surrounding the gamut;
    a data changing section for (i) reading from the color space storing section second color system image data corresponding to the grid points contained in the distribution area, and (ii) writing the second color system image data over data stored in the memory;
    a position information changing section for writing in the memory a content of position information on positions, in the color space of the first color system, of the grid points contained in the distribution area; and
    a reading section for reading from the memory the second color system image data of the grid points corresponding to the inputted image data of the first color system, by referring to the position information,
    the interpolating section performing an interpolation operation with the second color system image data read by the reading section, so as to generate interpolated image data of the second color system, corresponding to the inputted image data of the first color system.

2. The image processing apparatus as set forth in claim 1, further comprising:
    a characteristics data detecting section for generating characteristics data indicative of the inputted image, based on the inputted image data of the first color system; and
    a grid number changing section for changing the number of unit cells set in the color space of the first color system which the area selecting section refers to.

3. The image processing apparatus as set forth in claim 2, wherein the grid number changing section changes the number of unit cells by changing the number of divisions for each coordinate axis of the color space of the first color system.

4. The image processing apparatus as set forth in claim 2, wherein the characteristics data detecting section serves as a segmentation processing section for performing a segmentation process on the inputted image data of the first color system and sending, as the characteristics data, segmentation class information, indicative of a result of the segmentation process, to the grid number changing section.

5. The image processing apparatus as set forth in claim 2,
   wherein the inputted image data of the first color system is data read from a document, and
   wherein the characteristics data detecting section determines a type of document based on the image data of the first color system and sends, as the characteristics data, document type information, indicative of a type of the document, to the grid number changing section.

6. The image processing apparatus as set forth in claim 1,
   wherein the inputted image data of the first color system is data read from a document, and
   wherein the image processing apparatus further comprises a grid number changing section for obtaining document type information entered by a user and indicative of a document type, and, based on the document type information, changing the number of unit cells contained in the color space of the first color system which the area selecting section refers to.

7. The image processing apparatus as set forth in claim 1, further comprising a grid number changing section for obtaining quality data indicative of a quality of an inputted image or a quality of an output image outputted by the image processing apparatus, and, based on the quality data, changing the number of unit cells contained in the color space of the first color system which the area selecting section refers to.

8. The image processing apparatus as set forth in claim 7, wherein the quality data indicates a resolution of the inputted image or a resolution of the output image.

9. The image processing apparatus as set forth in claim 7, wherein the quality data indicates a size of the output image.

10. The image processing apparatus as set forth in claim 1, further comprising a grid number changing section for obtaining, from a printing apparatus that prints out an output image of the image processing apparatus, mode information indicative of a print mode set in the printing apparatus, and, based on the mode information, changing the number of unit cells set in the color space of the first color system which the area selecting section refers to.

11. The image processing apparatus as set forth in claim 1, further comprising a grid number changing section for changing, according to a command entered by a user, the number of unit cells set in the color space of the first color system which the area selecting section refers to.

12. The image processing apparatus as set forth in claim 1, further comprising a grid number changing section for obtaining element information indicative of elements of the inputted image data of the first color system, and, based on the element information, changing the number of unit cells contained in the color space of the first color system which the area selecting section refers to.

13. The image processing apparatus as set forth in claim 12, wherein the element information is scribed in page description language to discriminate text, graphic, and photographic images from one another.

14. The image processing apparatus as set forth in claim 13, wherein the inputted image data of the first color system is data read from a document, and
   wherein the grid number changing section obtains document type information indicative of a document type of the inputted image data of the first color system, and, based on the element information and the document type information, changes the number of unit cells.

15. The image processing apparatus as set forth in claim 1,
   wherein the color space storing section stores (i) a color space of the first color system which is divided in a grid pattern, and (ii) image data of the second color system, corresponding to grid points contained in a plurality of planes perpendicular to an arbitrary axis of the color space of the first color system.

16. An image forming apparatus comprising an image processing apparatus that comprises:
   an interpolating section for generating interpolated image data of a second color system, corresponding to inputted image data of a first color system, the inputted image data being data of an inputted image;
   a color space storing section for storing (i) a color space of the first color system, and (ii) image data of the second color system, corresponding to grid points set in the color space of the first color system;
   a rewritable memory;
   an area selecting section for selecting, from the color space of the first color system stored in the color space storing section, a distribution area of grid points which contains distributed grid points required for interpolating data in a gamut of the inputted image and which includes (i) the gamut of the inputted image, and (ii) an area surrounding the gamut;
   a data changing section for (i) reading from the color space storing section second color system image data corresponding to the grid points contained in the distribution area selected by the area selecting section, and (ii) writing the second color system image data over data stored in the memory;
   a position information changing section for writing in the memory a content of position information on positions, in the color space of the first color system, of the grid points contained in the distribution area; and
   a reading section for reading from the memory the second color system image data of the grid points corresponding to the inputted image data of the first color system, by referring to the position information,
   the interpolating section performing an interpolation operation with the second color system image data read by the reading section, so as to generate interpolated image data of the second color system, corresponding to the inputted image data of the first color system.

17. A method for image processing in an image processing apparatus that comprises:
   an interpolating section for generating interpolated image data of a second color system, corresponding to inputted image data of a first color system, the inputted image data being data of an inputted image;
   a color space storing section for storing (i) a color space of the first color system, and (ii) image data of the second color system, corresponding to grid points set in the color space of the first color system; and
   a rewritable memory,
   said method comprising the steps of:
   (a) selecting, from the color space of the first color system stored in the color space storing section, a distribution area which contains distributed grid points required for interpolating data in a gamut of the inputted image and which includes (i) the gamut of the inputted image, and (ii) an area surrounding the gamut;

(b) reading from the color space storing section second color system image data corresponding to the grid points contained in the distribution area;
(c) writing the second color system image data over data stored in the memory;
(d) reading from the memory the second color system image data of the grid points corresponding to the inputted image data of the first color system, by referring to the position information; and
(e) using the interpolating section to perform an interpolation operation with the second color system image data read in step (d), so as to generate interpolated image data of the second color system, corresponding to the inputted image data of the first color system.

18. A non-transitory computer-readable storage medium storing an image processing program for causing a computer to operate as respective sections of an image processing apparatus that comprises:

an interpolating section for generating interpolated image data of a second color system, corresponding to inputted image data of a first color system, the inputted image data being data of an inputted image;

a color space storing section for storing (i) a color space of the first color system, and (ii) image data of the second color system, corresponding to grid points set in the color space of the first color system;

a rewritable memory;

an area selecting section for selecting, from the color space of the first color system stored in the color space storing section, a distribution area which contains distributed grid points required for interpolating data in a gamut of the inputted image and which includes (i) the gamut of the inputted image, and (ii) an area surrounding the gamut;

a data changing section for (i) reading from the color space storing section second color system image data corresponding to the grid points contained in the distribution area selected by the area selecting section, and (ii) writing the second color system image data over data stored in the memory;

a position information changing section for writing in the memory a content of position information on positions, in the color space of the first color system, of the grid points contained in the distribution area; and a reading section for reading from the memory the second color system image data of the grid points corresponding to the inputted image data of the first color system, by referring to the position information, the interpolating section performing an interpolation operation with the second color system image data read by the reading section, so as to generate interpolated image data of the second color system, corresponding to the inputted image data of the first color system, said image processing program causing a computer to operate as the respective sections of the image processing apparatus.

* * * * *